United States Patent
Fairfield et al.

(10) Patent No.: US 11,882,356 B2
(45) Date of Patent: Jan. 23, 2024

(54) PALETTE AND INFRARED IMAGE GENERATION SYSTEMS AND METHODS

(71) Applicant: Teledyne FLIR Commercial Systems, Inc., Goleta, CA (US)

(72) Inventors: Nile E. Fairfield, Goleta, CA (US); Joseph Kostrzewa, Santa Ynez, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 0 days.

(21) Appl. No.: 17/542,309

(22) Filed: Dec. 3, 2021

(65) Prior Publication Data
US 2022/0182532 A1 Jun. 9, 2022

Related U.S. Application Data

(60) Provisional application No. 63/121,839, filed on Dec. 4, 2020.

(51) Int. Cl.
*H04N 23/62* (2023.01)
*H04N 9/64* (2023.01)

(52) U.S. Cl.
CPC ............... *H04N 23/62* (2023.01); *H04N 9/64* (2013.01)

(58) Field of Classification Search
CPC ............................ H04N 9/64; H04N 5/23216
USPC ........................................................ 348/165
See application file for complete search history.

(56) References Cited

U.S. PATENT DOCUMENTS

| | | |
|---|---|---|
| 7,242,409 B2 | 7/2007 | Cain |
| 2008/0265162 A1 | 10/2008 | Hamrelius et al. |
| 2015/0169169 A1* | 6/2015 | Andersson ............ G06F 3/0488 715/765 |

OTHER PUBLICATIONS

Zucconi, Alan, "The Secrets of Colour Interpolation", Jan. 6, 2016. [Retrieved: https://www.alanzucconi.com/2016/01/06/colour-interpolation/].

* cited by examiner

*Primary Examiner* — On S Mung
(74) *Attorney, Agent, or Firm* — Haynes and Boone, LLP

(57) ABSTRACT

Techniques for facilitating palette and infrared image generation systems and methods are provided. In one example, a method includes receiving user input indicative of a plurality of threshold temperatures to divide a temperature range into a plurality of temperature regions and a respective visual representation mode for each of the plurality of temperature regions. Each of the plurality of temperature regions is bound by at least one of the plurality of threshold temperatures. The respective visual representation mode for each of the plurality of temperature regions is a color mode or a grayscale mode. The method further includes generating a palette based on the user input. Related devices and systems are also provided.

20 Claims, 16 Drawing Sheets

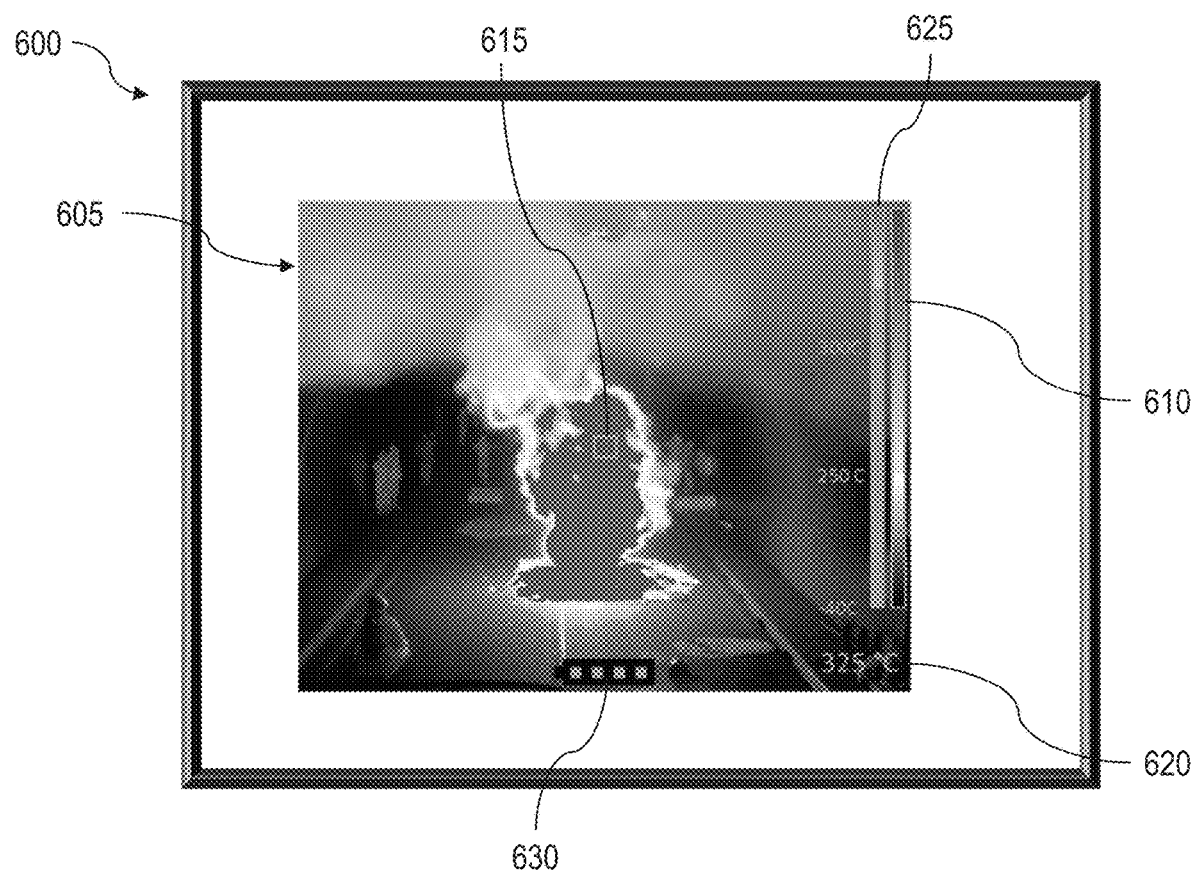
FIG. 6A
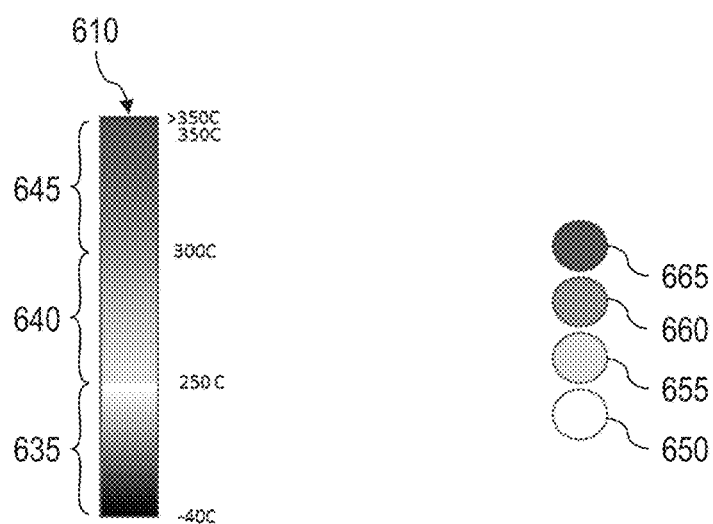
FIG. 6B
FIG. 6C

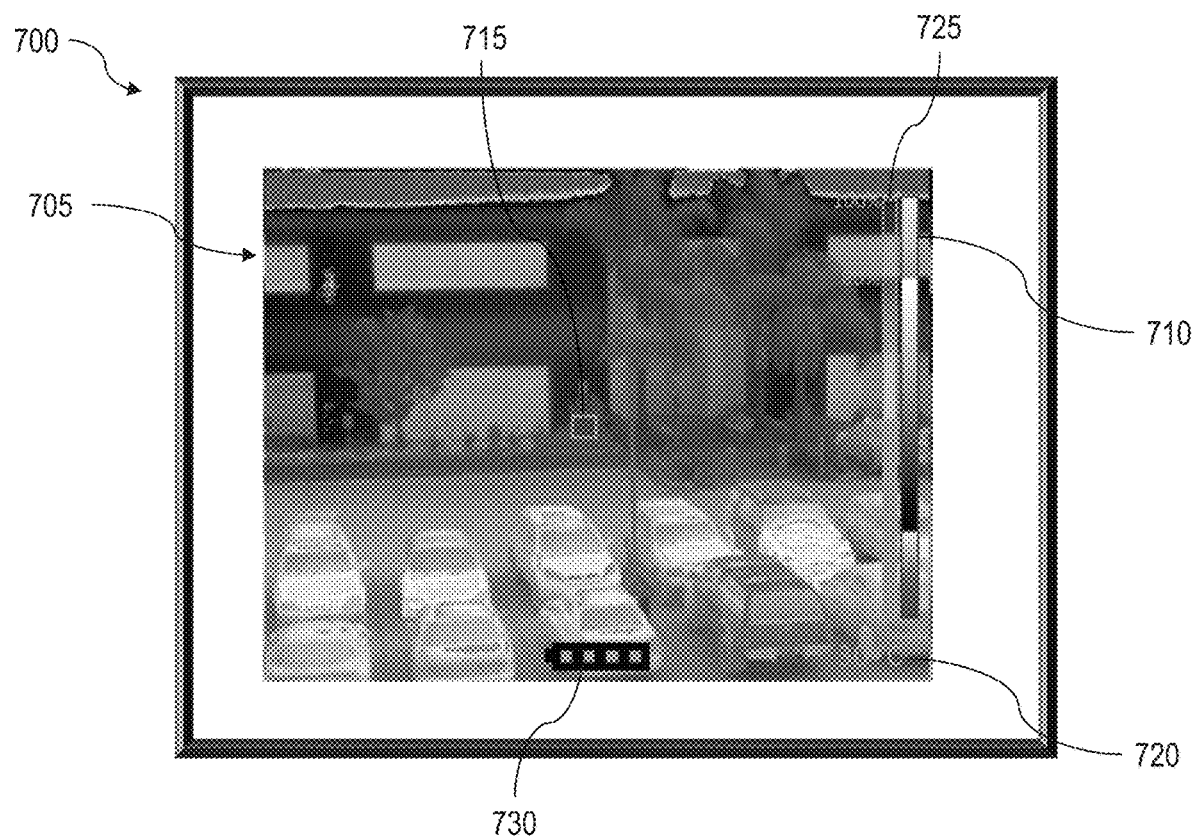
FIG. 7A
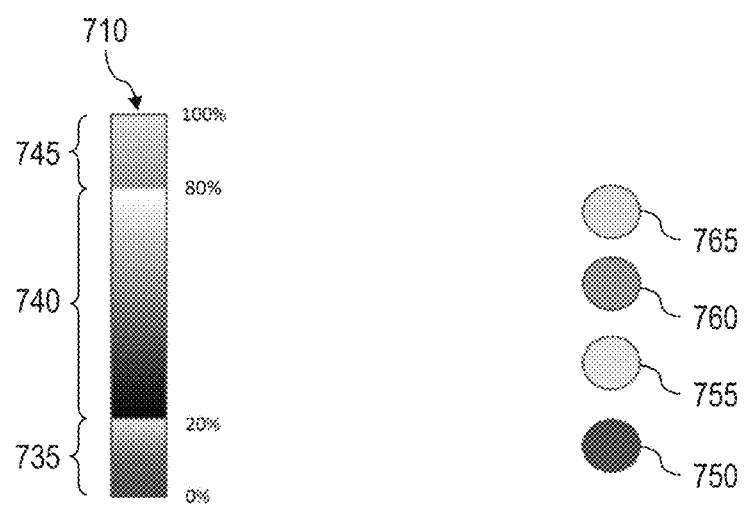
FIG. 7B
FIG. 7C

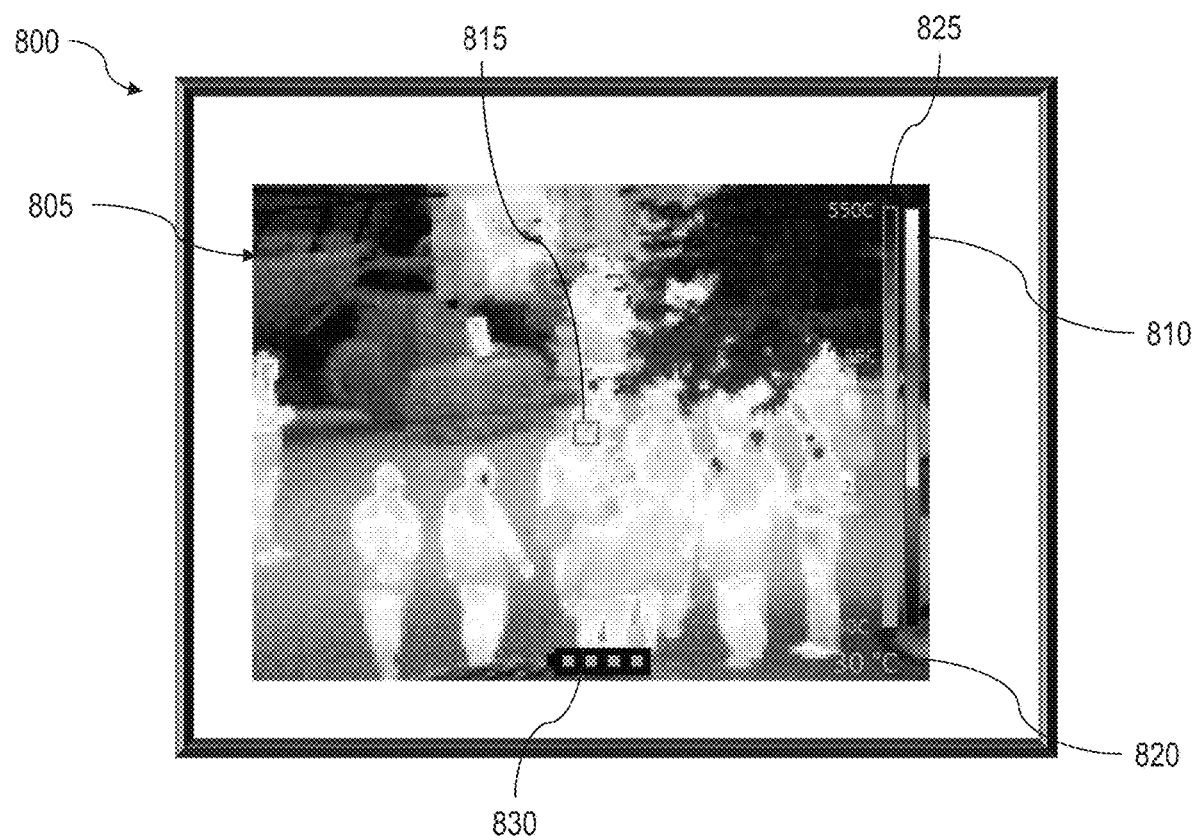
FIG. 8A
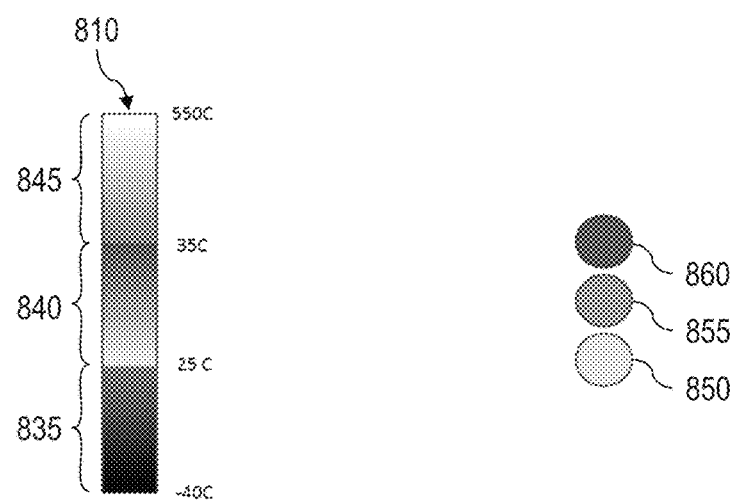
FIG. 8B
FIG. 8C

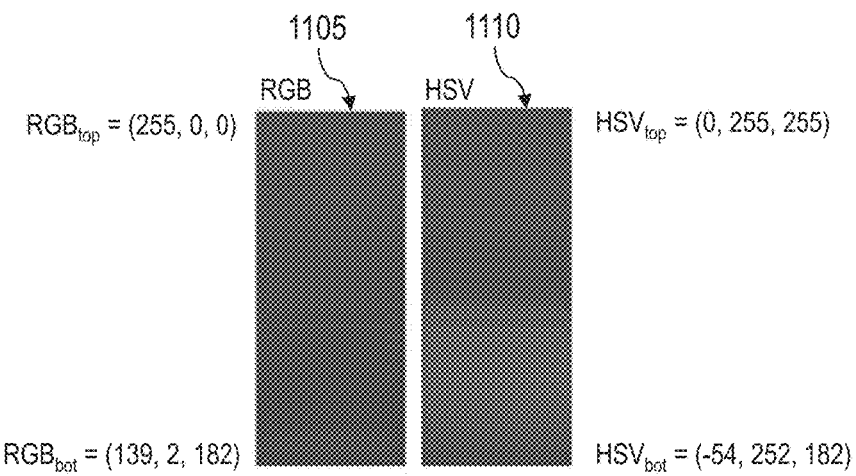
FIG. 11A
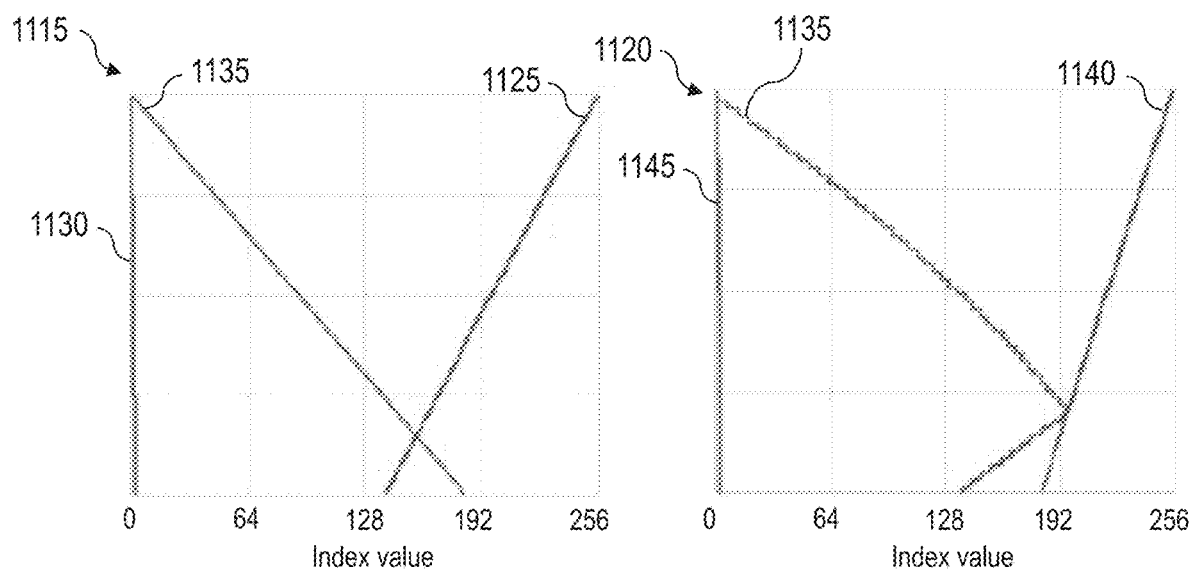
FIG. 11B
FIG. 11C

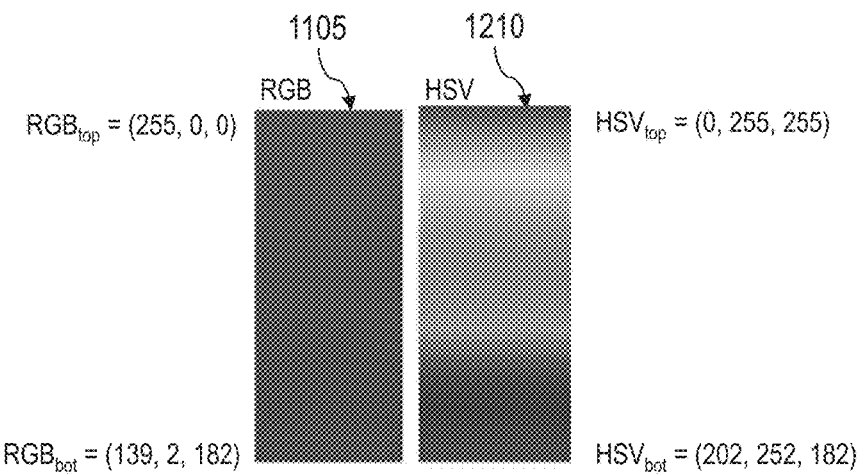
FIG. 12A
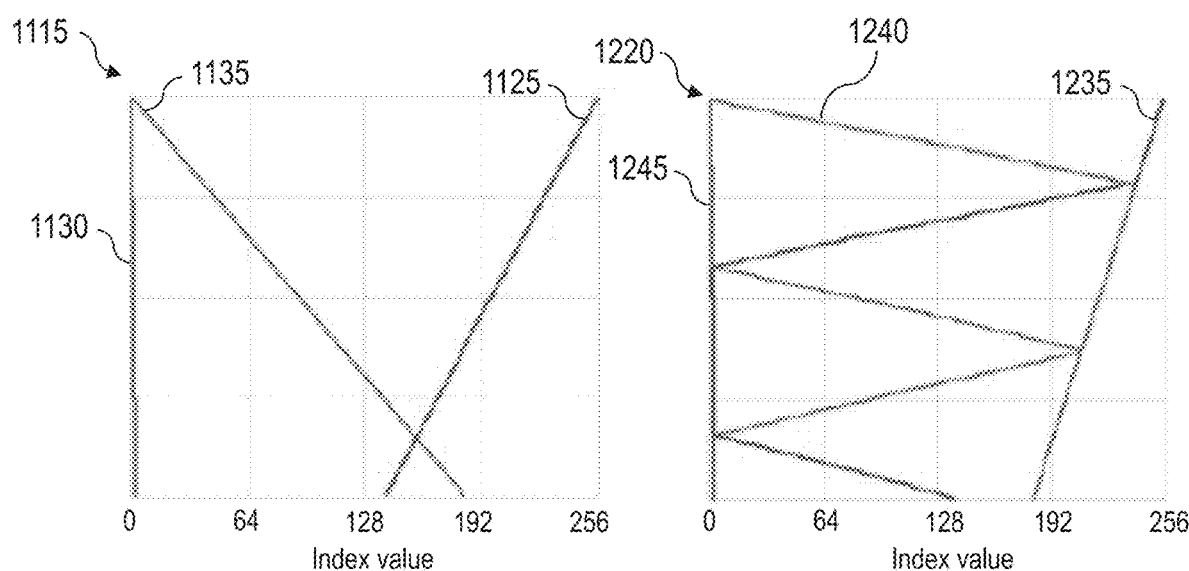
FIG. 12B
FIG. 12C

PALETTE AND INFRARED IMAGE GENERATION SYSTEMS AND METHODS

CROSS-REFERENCE TO RELATED APPLICATIONS

This application claims the benefit of and priority to U.S. Provisional Patent Application No. 63/121,839 filed Dec. 4, 2020 and entitled "PALETTE AND INFRARED IMAGE GENERATION SYSTEMS AND METHODS," which is incorporated herein by reference in its entirety.

TECHNICAL FIELD

One or more embodiments relate generally to imaging and more particularly, for example, to palette and infrared image generation systems and methods.

BACKGROUND

Imaging systems may include an array of detectors, with each detector functioning as a pixel to produce a portion of a two-dimensional image. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, a method includes receiving user input indicative of a plurality of threshold temperatures to divide a temperature range into a plurality of temperature regions and a respective visual representation mode for each of the plurality of temperature regions. Each of the plurality of temperature regions is bound by at least one of the plurality of threshold temperatures. The respective visual representation mode for each of the plurality of temperature regions is a color mode or a grayscale mode. The method further includes generating a palette based on the user input.

In one or more embodiments, an infrared imaging system includes a processing circuit configured to receive user input indicative of a plurality of threshold temperatures to divide a temperature range into a plurality of temperature regions and a respective visual representation mode for each of the plurality of temperature regions. Each of the plurality of temperature regions is bound by at least one of the plurality of threshold temperatures. The respective visual representation mode for each of the plurality of temperature regions is a color mode or a grayscale mode. The processing circuit is further configured to generate a palette based on the user input.

In one or more embodiments, a method includes determining a clipping value based on a soft saturation value associated with an FPA. The method further includes applying the clipping value to infrared image data from the FPA to obtain clipped infrared image data. The method further includes applying a palette to the clipped infrared image data to obtain an infrared image.

In one or more embodiments, an infrared imaging system includes a processing circuit configured to determine a clipping value based on a soft saturation value associated with an FPA. The processing circuit is further configured to apply the clipping value to infrared image data from the FPA to obtain clipped infrared image data. The processing circuit is further configured to apply a palette to the clipped infrared image data to obtain an infrared image.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 6A illustrates an example display screen with an infrared image displayed thereon in accordance with one or more embodiments of the present disclosure.

FIG. 6B illustrates an enlarged and annotated view of a color bar associated with the infrared image shown in FIG. 6A.

FIG. 6C illustrates example indicators of endpoint colors of temperature thresholds associated with the color bar shown in FIG. 6B.

FIG. 7A illustrates an example display screen with an infrared image displayed thereon in accordance with one or more embodiments of the present disclosure.

FIG. 7B illustrates an enlarged and annotated view of a color bar associated with the infrared image shown in FIG. 7A.

FIG. 7C illustrates example indicators of endpoint colors of temperature thresholds associated with the color bar shown in FIG. 7B.

FIG. 8A illustrates an example display screen with an infrared image displayed thereon in accordance with one or more embodiments of the present disclosure.

FIG. 8B illustrates an enlarged and annotated view of a color bar associated with the infrared image shown in FIG. 8A.

FIG. 8C illustrates example indicators of endpoint colors of temperature thresholds associated with the color bar shown in FIG. 8B.

FIG. 11A illustrates example color regions having the same endpoint color values with color values between these endpoint color values interpolated in different color spaces.

FIGS. 11B and 11C provide trajectory plots associated with the color regions shown in FIG. 11A.

FIG. 12A illustrates example color regions having the same endpoint color values with color values between these endpoint color values interpolated in different color spaces.

FIGS. 12B and 12C provide trajectory plots associated with the color regions shown in FIG. 12A.

Figure 1:
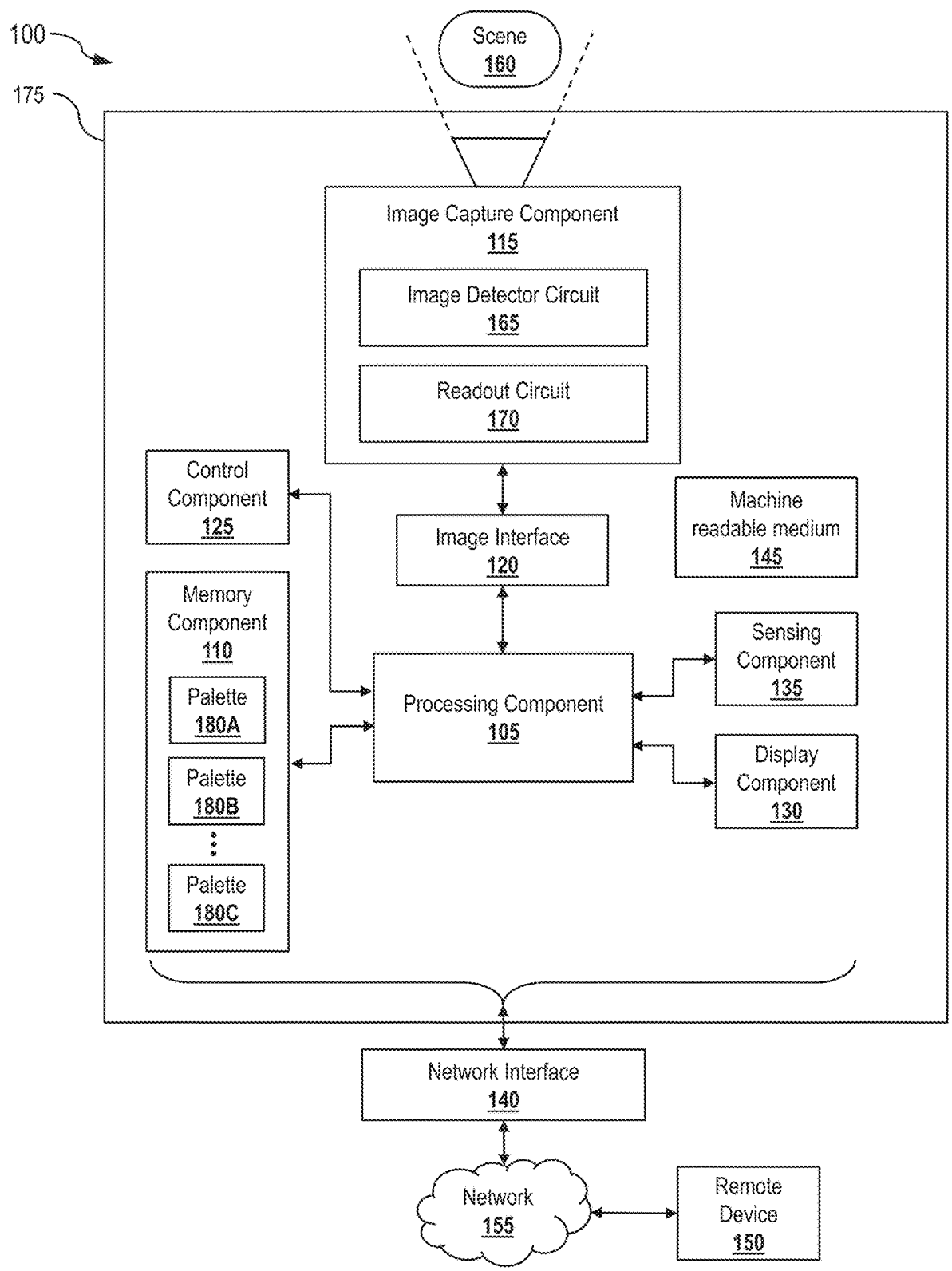
FIG. 1 illustrates a block diagram of an example imaging system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided to facilitate palette generation and/or infrared image generation systems and methods. In some embodiments, an imaging system includes a detector array and a readout circuit. The detector array includes detectors (e.g., also referred to as detector pixels, detector elements, or simply pixels). Each detector pixel detects incident EM radiation and generates image data indicative of the detected EM radiation of a scene.

A palette is generated to provide a mapping from distinct output levels to visual representation values. In some cases, the palette may be applied to image data values output by the detector array (e.g., based on detected EM radiation) to generate an image. In this regard, an image may be considered a visual representation of the image data values. Visual representation values of a palette may include color values and/or grayscale values. In some cases, the visual representation values may facilitate analysis of the scene by a user(s) of the imaging system and/or by circuitry (e.g., machine vision) of the imaging system and/or other machine(s).

In some embodiments, the detector array is used to detect infrared radiation (e.g., thermal infrared radiation). For pixels of an infrared image (e.g., thermal infrared image), each output value of a pixel may be represented/provided as and/or correspond to a temperature, digital count value, percentage of a full temperature range, or generally any value that can be mapped to the temperature. For example, a digital count value of 13,000 output by a pixel may represent a temperature of 160° C.

The palette may define regions (e.g., non-overlapping temperature regions) and visual representation values (e.g., color values or grayscale values) for each region. The palette may be defined based at least in part on user input from a user according to one or more embodiments. For a given region, the user input may include an indication of whether the region is to be represented in a color mode (e.g., using color values) or a grayscale mode (e.g., using grayscale values). Each region may be independently set to a color mode or a grayscale mode. In some aspects, a palette may include color values exclusively (e.g., infrared image data values are mapped exclusively to color values), grayscale values exclusively, or a combination of color values and grayscale values. In some aspects, for infrared imaging, the user input may include threshold temperatures to divide a temperature range into temperature regions. In one example, the palette may be defined with distinct, non-overlapping regions in which at least one region may map infrared image data values to grayscale values and at least one region may map infrared image data values to color values.

In some aspects, the user may provide an indication of a visual representation value at each endpoint/boundary of each region. For example, for a region bound by two threshold temperatures, the user input may include a color value for each threshold temperature. The imaging system may interpolate between these two color values from the user to obtain color values associated with temperatures between the pair of threshold temperatures. In one example, the user may provide the two color values in a red, green, blue (RGB) color space, and the imaging system may convert these two color values to a hue, saturation, value (HSV) color space and interpolate between these two color values in the HSV color space. In some cases, the HSV color space may be more amenable to creating a gradient between two colors (e.g., relative to the RGB color space or other color space). As non-limiting examples, color values may be represented using RGB values, CMY values, YCrCb values, HSV values, CIEXYZ values, CIELab values, and/or other color space/model (e.g., standard color model, user-defined color model, etc.). Interpolation between color values and/or interpolation between grayscale values may be performed using linear interpolation techniques, non-linear interpolation techniques, and/or other interpolation techniques. Different regions may be associated with different interpolation techniques.

Since infrared radiation is generally not visible to a human eye, there are no natural relations between captured infrared image data values of each pixel in an infrared image and visual representation values of the infrared image. To depict infrared image data values, the palette may include color values and/or grayscale values selected to provide appropriate stimulation for a desired application(s). In some cases, color values and/or grayscale values for each region may be selected with consideration to aesthetics.

Compared to conventional techniques in which a fixed color table is used for an entire temperature range, the user may define multiple temperature regions and visual representation values at an endpoint(s) of each temperature region according to one or more embodiments. Thus, using various embodiments, users are provided with flexibility to adapt visual representation schemes to match an application(s).

In some embodiments, clipping may be applied to pixels of the detector array to limit/set a maximum pixel value output by the pixels of the detector array to a soft saturation value of a pixel of the detector array having the lowest soft saturation value. In this regard, at an output of the imaging system, some pixels of the detector array may rail (e.g., saturate) at values less than a maximum digital value that can be output by a corresponding analog-to-digital converter (ADC) circuit. For example, for a 16-bit ADC, 65,535 may be a maximum output value for the ADC, and these pixels of the detector array may rail to a value less than 65,535. Such railing may be due to non-uniformity correction (NUC) terms applied to the pixels and may be referred to as soft saturation, effective pixel saturation, or simply saturation. For a given pixel of the imaging system, a value (e.g., digital count value) at which the pixel is railed/saturated may be referred to as a soft saturation value, an effective pixel saturation value, or simply a saturation value.

Each pixel may be associated with its respective NUC terms and thus its respective soft saturation value. When pixels exhibit varying soft saturation values, a resulting image may appear grainy when imaging intense sources. An intense source may be a source that causes different pixels of the detector array to rail/saturate to their respective soft saturation values, thus resulting in graininess in the resulting image. By applying the clipping value to the pixels, a resulting image generated based on data values output by the pixels (e.g., clipped data values for data values above the lowest soft saturation value of the detector array) may remove non-uniformity and graininess that may be present in an image that captures a scene having an intense source.

Although various embodiments of methods and systems for palette and image generation are described with respect to infrared imaging (e.g., thermal infrared imaging), palette and imaging generation techniques may be applied to other wavebands to facilitate visual representation (e.g., to a user(s) and/or machine(s)) of captured radiation of these other wavebands. Various embodiments of methods and systems disclosed herein may be included in or implemented as various devices and systems such as visible-light imaging systems, infrared imaging systems, imaging systems having visible-light and infrared imaging capability, short-wave infrared (SWIR) imaging systems, light detection and ranging (LIDAR) imaging systems, radar detection and ranging (RADAR) imaging systems, millimeter wavelength (MMW) imaging systems, ultrasonic imaging systems, X-ray imaging systems, mobile digital cameras, video surveillance systems, video processing systems, or other systems or devices that may need to obtain image data in one or multiple portions of the EM spectrum.

Referring now to the drawings, FIG. 1 illustrates a block diagram of an example imaging system 100 (e.g., an infrared camera, a tablet computer, a laptop, a personal digital assistant (PDA), a mobile device, a desktop computer, or other electronic device) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of EM radiation and provides representative data (e.g., one or more still image frames or video image frames). The imaging system 100 may include a housing that at least partially encloses components of the imaging system 100, such as to facilitate compactness and protection of the imaging system 100. For example, the solid box labeled 175 in FIG. 1 may represent a housing of the imaging system 100. The housing may contain more, fewer, and/or different components of the imaging system 100 than those depicted within the solid box in FIG. 1. In an embodiment, the imaging system 100 may include a portable device and may be incorporated, for example, into a vehicle or a non-mobile installation requiring images to be stored and/or displayed. The vehicle may be a land-based vehicle (e.g., automobile, truck), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 100. In another example, the imaging system 100 may be coupled to various types of fixed locations (e.g., a home security mount, a campsite or outdoors mount, or other location) via one or more types of mounts.

The imaging system 100 includes, according to one implementation, a processing component 105, a memory component 110, an image capture component 115, an image interface 120, a control component 125, a display component 130, a sensing component 135, and/or a network interface 140. The processing component 105, according to various embodiments, includes one or more of a processor, a microprocessor, a central processing unit (CPU), a graphics processing unit (GPU), a single-core processor, a multicore processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The processing component 105 may be configured to interface and communicate with the various other components (e.g., 110, 115, 120, 125, 130, 135, 140, etc.) of the imaging system 100 to perform such operations. For example, the processing component 105 may be configured to process captured image data received from the imaging capture component 115, store the image data in the memory component 110, and/or retrieve stored image data from the memory component 110. In one aspect, the processing component 105 may be configured to perform various system control operations (e.g., to control communications and operations of various components of the imaging system 100) and other image processing operations (e.g., data conversion, video analytics, etc.).

The memory component 110 includes, in one embodiment, one or more memory devices configured to store data and information, including infrared image data and information. The memory component 110 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processing component 105 may be configured to execute software instructions stored in the memory component 110 so as to perform method and process steps and/or operations. In one or more embodiments, such instructions, when executed by the processing component 105, may cause the imaging system 100 to perform operations to generate palettes and/or apply palettes to image data captured by the image capture component 115 to generate images. The palettes may map image data values to visual representation values. Visual representation values may include color values and/or grayscale values. The processing component 105 and/or the image interface 120 may be configured to store in the memory component 110 images or digital image data captured by the image capture component 115. The processing component 105 may be configured to store processed still and/or video images in the memory component 110.

In some embodiments, the memory component 110 stores palettes 180A, 180B, and 180C, which may be arranged as lookup tables, functional modules, or other data structure. Ellipses between the palettes 180B and 180C indicate that one or more additional palettes are present between the palettes 180B and 180C or no palettes are present between the palettes 180B and 180C. In some aspects, the palettes 180A, 180B, and 180C may include one or more predefined palettes (e.g., defined by a manufacturer of the imaging system 100) and/or one or more user defined/specified palette(s).

In some embodiments, a separate machine-readable medium 145 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 145 may be portable and/or located separate from the imaging system 100, with the stored software instructions and/or data provided to the imaging system 100 by coupling the machine-readable medium 145 to the imaging system 100 and/or by the imaging system 100 downloading (e.g., via a wired link and/or a wireless link) from the machine-readable medium 145. It should be appreciated that various modules may be integrated in software and/or hardware as part of the processing component 105, with code (e.g., software or configuration data) for the modules stored, for example, in the memory component 110.

The imaging system 100 may represent an imaging device, such as a video and/or still camera, to capture and process images and/or videos of a scene 160. In this regard, the image capture component 115 of the imaging system 100 may be configured to capture images (e.g., still and/or video images) of the scene 160 in a particular spectrum or modality. The image capture component 115 includes an image detector circuit 165 (e.g., a thermal infrared detector circuit) and a readout circuit 170 (e.g., an ROIC). For example, the image capture component 115 may include an IR imaging sensor (e.g., IR imaging sensor array) configured to detect IR radiation in the near, middle, and/or far IR spectrum and provide IR images (e.g., IR image data or signal) representative of the IR radiation from the scene 160. For example, the image detector circuit 165 may capture (e.g., detect, sense) IR radiation with wavelengths in the range from around 700 nm to around 2 mm, or portion thereof. For example, in some aspects, the image detector circuit 165 may be sensitive to (e.g., better detect) SWIR radiation, mid-wave IR (MWIR) radiation (e.g., EM radiation with wavelength of 2 µm to 5 µm), and/or long-wave IR (LWIR) radiation (e.g., EM radiation with wavelength of 7 µm to 14 µm), or any desired IR wavelengths (e.g., generally in the 0.7 µm to 14 µm range). In other aspects, the image detector circuit 165 may capture radiation from one or more other wavebands of the EM spectrum, such as visible-light, ultraviolet light, and so forth.

The image detector circuit 165 may capture image data (e.g., infrared image data) associated with the scene 160. To capture the image, the image detector circuit 165 may detect image data of the scene 160 (e.g., in the form of EM radiation) and generate pixel values of the image based on the scene 160. An image may be referred to as a frame or an image frame. In an aspect, an image may be considered a visual representation of captured image data. In some cases, the image detector circuit 165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns. In an embodiment, the image detector circuit 165 may receive energy flux (e.g., thermal infrared energy flux) from an object(s) in the scene 160 and convert the energy flux to data values indicative of temperatures of the object(s) in the scene 160. The imaging system 100 may be radiometrically calibrated to ensure accurate conversion from the amount of energy received by the image detector circuit 165 to the data values generated by the image detector circuit 165.

The image may be, or may be considered, a data structure that includes pixels and is a representation of the image data associated with the scene 160, with each pixel having a pixel value that represents EM radiation emitted or reflected from a portion of the scene and received by a detector that generates the pixel value. Based on context, a pixel may refer to a detector of the image detector circuit 165 that generates an associated pixel value or a pixel (e.g., pixel location, pixel coordinate) of the image formed from the generated pixel values. In an embodiment, the image may be a thermal infrared image (e.g., also referred to as a thermal image) based on thermal infrared image data. Each pixel value of the thermal infrared image represents a temperature of a corresponding portion of the scene 160.

In an aspect, the pixel values generated by the image detector circuit 165 may be represented in terms of digital count values generated based on the electrical signals obtained from converting the detected radiation. For example, in a case that the image detector circuit 165 includes or is otherwise coupled to an ADC circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 165 (e.g., an IR image detector circuit) is associated with higher digital count values and higher temperatures.

For infrared imaging, characteristics associated with the image detector circuit 165 (and its associated ADC circuit if any) may include, by way of non-limiting examples, a dynamic range, a minimum temperature that can be reliably represented, a maximum temperature that can be reliably represented, and a sensitivity. The dynamic range may be, or may be indicative of, a range (e.g., difference) between the minimum temperature and the maximum temperature that can be captured by the image detector circuit 165 and represented in an infrared image. In this regard, areas of the scene 160 that are below the minimum temperature may be buried in a noise floor of the imaging system 100 and appear washed out and/or noisy in the IR image. Areas of the scene 160 above the maximum temperature cause saturation in the infrared image, in which the areas that are saturated are represented in the same manner (e.g., using the same color value or the same grayscale value) as areas at the maximum temperature. For example, when the image detector circuit 165 generates digital count values using an ADC circuit, temperatures at or above the maximum temperature may all be mapped to the highest value that can be represented by the ADC circuit (e.g., 16,383 for a 14-bit ADC circuit), and temperatures at or below the minimum temperature may all be mapped to the lowest value (e.g., 0) that can be represented by the ADC circuit. In other words, the infrared image does not distinguish between areas above the maximum temperature and areas at the maximum temperature and does not distinguish between areas below the minimum temperature and areas at the minimum temperature. In some embodiments, due to gain correction and offset correction, each pixel/detector of the image detector circuit 165 may rail (e.g., saturate) at values less than a maximum value output by a corresponding ADC circuit of the pixel/detector. Such railing may be referred to as a soft saturation, effective pixel saturation, or simply saturation. In this regard, for a given pixel of the imaging system 100, a value (e.g., digital count value) at which the pixel is railed/saturated may be referred to as a soft saturation value, an effective pixel saturation value, or simply a saturation value.

To determine a corresponding color value for an infrared data value of a pixel, the infrared data value may be mapped to an output level of the palette. Each output level of the palette may be associated with a color value or a grayscale value. In some aspects, each possible infrared data value has a corresponding output level. In such aspects, the number of output levels of the palette may be equal to or exceed the number of possible infrared data values. For example, in some cases, a 14-bit infrared data value may take on a value between 0 and 16,383, inclusive, and the output levels of the palette may also encompass at least 16,384 levels (e.g., 0 to 16,383 or other representation of 16,384 output levels). In other aspects, the number of output levels of the palette may be fewer than the number of possible values for the infrared data value. In such aspects, ranges of infrared data values may be mapped to the same output level of the palette. Such a mapping between the infrared data values and the output level may be defined by the imaging system 100 (e.g., by dividing the number of possible infrared data values into the number of possible output levels) or user defined. In some cases, a palette may be stored as a lookup table or other appropriate data structure.

The readout circuit 170 may be utilized as an interface between the image detector circuit 165 that detects the image data and the processing component 105 that processes the detected image data as read out by the readout circuit 170, with communication of data from the readout circuit 170 to the processing component 105 facilitated by the image interface 120. An image capturing frame rate may refer to the rate (e.g., images per second) at which images are detected in a sequence by the image detector circuit 165 and provided to the processing component 105 by the readout circuit 170. The readout circuit 170 may read out the pixel values generated by the image detector circuit 165 in accordance with an integration time (e.g., also referred to as an integration period).

In various embodiments, a combination of the image detector circuit 165 and the readout circuit 170 may be, may include, or may together provide an FPA. In some aspects, the image detector circuit 165 may be a thermal image detector circuit that includes an array of microbolometers, and the combination of the image detector circuit 165 and the readout circuit 170 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometers may absorb incident IR radiation and produce a corresponding change in temperature in the microbolometers. The change in temperature is associated with a corresponding change in resistance of the microbolometers. With each microbolometer functioning as a pixel, a two-dimensional image or picture representation of the incident IR radiation can be generated by translating the changes in resistance of each microbolometer into a time-multiplexed electrical signal. The translation may be performed by the ROIC. The microbolometer FPA may include IR detecting materials such as amorphous silicon (a-Si), vanadium oxide (VO$_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the imaging capture component 115 may include one or more filters adapted to pass radiation of some wavelengths but substantially block radiation of other wavelengths. For example, the imaging capture component 115 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the imaging capture component 115 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 115 may include an IR imaging sensor having an FPA of detectors responsive to IR radiation including near infrared (NIR), SWIR, MWIR, LWIR, and/or very-long wave IR (VLWIR) radiation. In some other embodiments, alternatively or in addition, the image capture component 115 may include a complementary metal oxide semiconductor (CMOS) sensor or a charge-coupled device (CCD) sensor that can be found in any consumer camera (e.g., visible light camera).

Other imaging sensors that may be embodied in the image capture component 115 include a photonic mixer device (PMD) imaging sensor or other time of flight (ToF) imaging sensor, LIDAR imaging device, RADAR imaging device, MMW imaging device, X-ray imaging device, positron emission tomography (PET) scanner, single photon emission computed tomography (SPECT) scanner, ultrasonic imaging device, or other imaging devices operating in particular modalities and/or spectra. Various of these imaging devices are associated with spectra generally not visible to a human eye and thus no natural relationship between captured data (e.g., intensity values) and visual representation. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 115 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 120 may include, in some embodiments, appropriate input ports, connectors, switches, and/or circuitry configured to interface with external devices (e.g., a remote device 150 and/or other devices) to receive images (e.g., digital image data) generated by or otherwise stored at the external devices. The received images or image data may be provided to the processing component 105. In this regard, the received images or image data may be converted into signals or data suitable for processing by the processing component 105. For example, in one embodiment, the image interface 120 may be configured to receive analog video data and convert it into suitable digital data to be provided to the processing component 105.

The image interface 120 may include various standard video ports, which may be connected to a video player, a video camera, or other devices capable of generating standard video signals, and may convert the received video signals into digital video/image data suitable for processing by the processing component 105. In some embodiments, the image interface 120 may also be configured to interface with and receive images (e.g., image data) from the image capture component 115. In other embodiments, the image capture component 115 may interface directly with the processing component 105.

In some embodiments, the imaging system 100 may be selectively operated in one of multiple operation modes. For example, imaging modes available to the imaging system 100 may include a low gain mode or a high gain mode. The high gain mode may be associated with higher sensitivity than the low gain mode, whereas the low gain mode may be associated with higher dynamic range (e.g., a broader temperature range) than the high gain mode. The low gain mode may have a lower minimum temperature and/or a higher maximum temperature than the high gain mode. In some cases, the high gain mode may utilize a longer integration time and the low gain mode may utilize a shorter integration time. An infrared image generated using the high gain mode or the low gain mode may be referred to as a high gain infrared image or a low gain infrared image, respectively.

The imaging system 100 may transition between operating in the low gain mode and high gain mode. In some cases, a transition from a high gain mode to a low gain mode may occur (e.g., autonomously by the imaging system 100 or based on user input) when the number of pixels saturating and/or nearing the saturation temperature (e.g., exceeding 90% of the saturation temperature) reaches a threshold number of pixels, whereas a transition from a low gain mode to a high gain mode may occur when the number of pixels not saturating exceeds a threshold number of pixels. For example, for the imaging system 100 operated in the high gain mode, the imaging system 100 may transition from the high gain mode to the low gain mode when a threshold number of pixels generate pixel values exceeding a high-to-low saturation threshold value, and may otherwise remain in the high gain mode if these conditions are not satisfied. The imaging system 100 may transition from the low gain mode to the high gain mode when a threshold number of pixels generate pixel values below a low-to-high saturation threshold value, and may otherwise remain in the low gain mode if these conditions are not satisfied.

In an aspect, while the low gain mode and the high gain mode encompass the same output range (e.g., 0 to 65,535 when a 16-bit ADC circuit is used), the low gain mode is associated with a different temperature range than the high gain mode. For example, in the 14-bit case (e.g., 0 to 16,383), a count value of 12,000 generated by a pixel operated in the low gain mode may be indicative of a temperature of 400° C., whereas the same count value of 12,000 generated by a pixel operated in the high gain mode may be indicative of a temperature of 120° C. In an aspect, in the high gain mode, the pixels of the image detector circuit 165 may have a saturation temperature between around 150° C. and around 250° C. In the low gain mode operation, the pixels may have a saturation temperature between around 500° C. and around 600° C.

Utilizing one or more of the imaging modes may facilitate accommodation of scenes of varying irradiance/temperature levels. The use of multiple image capture modes may facilitate capture of image scenes that involve large variations in temperature by the image capture component 115. The high gain mode may provide higher sensitivity but saturate when imaging relatively hot (or cold) objects, whereas the low gain mode may provide greater scene temperature range but lower sensitivity.

One or more palettes may be applied to image data captured using low gain mode operation and one or more palettes may be applied to image data captured using high gain mode operation. In some cases, a palette defined for the low gain mode may have a corresponding palette defined for the high gain mode, and vice versa. For example, for the low gain mode operation, the user may define a palette for human detection applications to present captured infrared data values using color values and/or grayscale values. The user may also define a palette for human detection applications for high gain mode operation. In some cases, the user may define a palette for one of the low gain mode operation or the high gain mode operation and request that the imaging system 100 generate a corresponding palette for the other mode based on the user-defined palette.

Corresponding palettes between the low gain mode palettes and the high gain mode palettes may have the same number of regions or a different number of regions. A region represented using color values in a palette for the low gain mode may be represented using grayscale values in a corresponding palette for the high gain mode. A temperature range of the low gain mode may be divided using a different set of threshold temperatures (e.g., user-defined threshold temperatures) than the set of threshold temperatures for dividing a temperature range of the high gain mode. In an example where an output range is provided as a 16-bit count value (e.g., 0 to 65,536), count values associated the threshold temperatures of the low gain mode may be, but need not be, different from count values associated with the threshold temperatures. For example, a region of the low gain mode associated with a lowest temperature range may encompass count values 0 to $N_{LG1}$ and the corresponding region of the high gain mode may encompass count values 0 to $N_{HG1}$, where $N_{LG1}$ may be, but need not be, the same as $N_{HG1}$.

In some embodiments, the imaging system 100 may be operated in other modes aside from the high gain and low gain modes, such as a medium gain mode with sensitivity and/or dynamic range between those of the high gain mode and low gain mode. Additional imaging modes may allow for finer tuning and/or extension of the sensitivity, dynamic range, minimum temperature, and/or maximum temperature to accommodate various scenes/applications that may be encountered by the imaging system 100. Various components of the imaging system 100 may include a respective pipeline for each operation mode. For example, the imaging capture component 115 (e.g., the readout circuit 170 of the imaging capture component 115), the image interface 120, the processing component 105, and/or other components of the imaging system 100 may include different pipelines to support the different operation modes. Additional examples of imaging systems selectively operable in multiple modes of operation are provided in U.S. patent application Ser. No. 16/511,401, which is incorporated herein by reference in its entirety.

The control component 125 includes, in one embodiment, a user input and/or an interface device, such as a rotatable knob (e.g., potentiometer), push buttons, slide bar, keyboard, and/or other devices, that is adapted to generate a user input control signal. The processing component 105 may be configured to sense control input signals from a user via the control component 125 and respond to any sensed control input signals received therefrom. The processing component 105 may be configured to interpret such a control input signal as a value, as generally understood by one skilled in the art. In one embodiment, the control component 125 may include a control unit (e.g., a wired or wireless handheld control unit) having push buttons adapted to interface with a user and receive user input control values. In one implementation, the push buttons of the control unit may be used to control various functions of the imaging system 100, such as autofocus, menu enable and selection, field of view, brightness, contrast, noise filtering, image enhancement, and/or various other features of an imaging system or camera. In an embodiment, the control component 125 may receive user input to facilitate defining/generating of palettes.

The display component 130 includes, in one embodiment, an image display device (e.g., a liquid crystal display (LCD)) or various other types of generally known video displays or monitors. The processing component 105 may be configured to display image data and information on the display component 130. The processing component 105 may be configured to retrieve image data and information from the memory component 110 and display any retrieved image data and information on the display component 130. The display component 130 may include display circuitry, which may be utilized by the processing component 105 to display image data and information. The display component 130 may be adapted to receive image data and information directly from the image capture component 115, processing component 105, and/or image interface 120, or the image data and information may be transferred from the memory component 110 via the processing component 105. In an embodiment, the display component 130 may display graphical user interfaces appropriate to request and receive user input related to defining/generating palettes.

The sensing component 135 includes, in one embodiment, one or more sensors of various types, depending on the application or implementation requirements, as would be understood by one skilled in the art. Sensors of the sensing component 135 provide data and/or information to at least the processing component 105. In one aspect, the processing component 105 may be configured to communicate with the sensing component 135. In various implementations, the sensing component 135 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 135 may represent conventional sensors as generally known by one skilled in the art for monitoring various conditions (e.g., environmental conditions) that may have an effect (e.g., on the image appearance) on the image data provided by the image capture component 115. In an aspect, the sensing component 135 may include one or more temperature sensors to detect/monitor a temperature of one or more components of the imaging system 100. For example, one of the temperature sensors may detect/monitor a temperature of the image detector circuit 165.

In some implementations, the sensing component 135 (e.g., one or more sensors) may include devices that relay information to the processing component 105 via wired and/or wireless communication. For example, the sensing component 135 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 105 can use the information (e.g., sensing data) retrieved from the sensing component 135 to modify a configuration of the image capture component 115 (e.g., adjusting a light sensitivity level, adjusting a direction or angle of the image capture component 115, adjusting an aperture, etc.).

In some embodiments, various components of the imaging system 100 may be distributed and in communication with one another over a network 155. In this regard, the imaging system 100 may include a network interface 140 configured to facilitate wired and/or wireless communication among various components of the imaging system 100 over the network 155. In such embodiments, components may also be replicated if desired for particular applications of the imaging system 100. That is, components configured for same or similar operations may be distributed over a network. Further, all or part of any one of the various components may be implemented using appropriate components of the remote device 150 (e.g., a conventional digital video recorder (DVR), a computer configured for image processing, and/or other device) in communication with various components of the imaging system 100 via the network interface 140 over the network 155, if desired. Thus, for example, all or part of the processing component 105, all or part of the memory component 110, and/or all of part of the display component 130 may be implemented or replicated at the remote device 150. In some embodiments, the imaging system 100 may not include imaging sensors (e.g., image capture component 115), but instead receive images or image data from imaging sensors located separately and remotely from the processing component 105 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the processing component 105 may be combined with the memory component 110, image capture component 115, image interface 120, display component 130, sensing component 135, and/or network interface 140. In another example, the processing component 105 may be combined with the image capture component 115, such that certain functions of processing component 105 are performed by circuitry (e.g., a processor, a microprocessor, a logic device, a microcontroller, etc.) within the image capture component 115.

Figure 2:
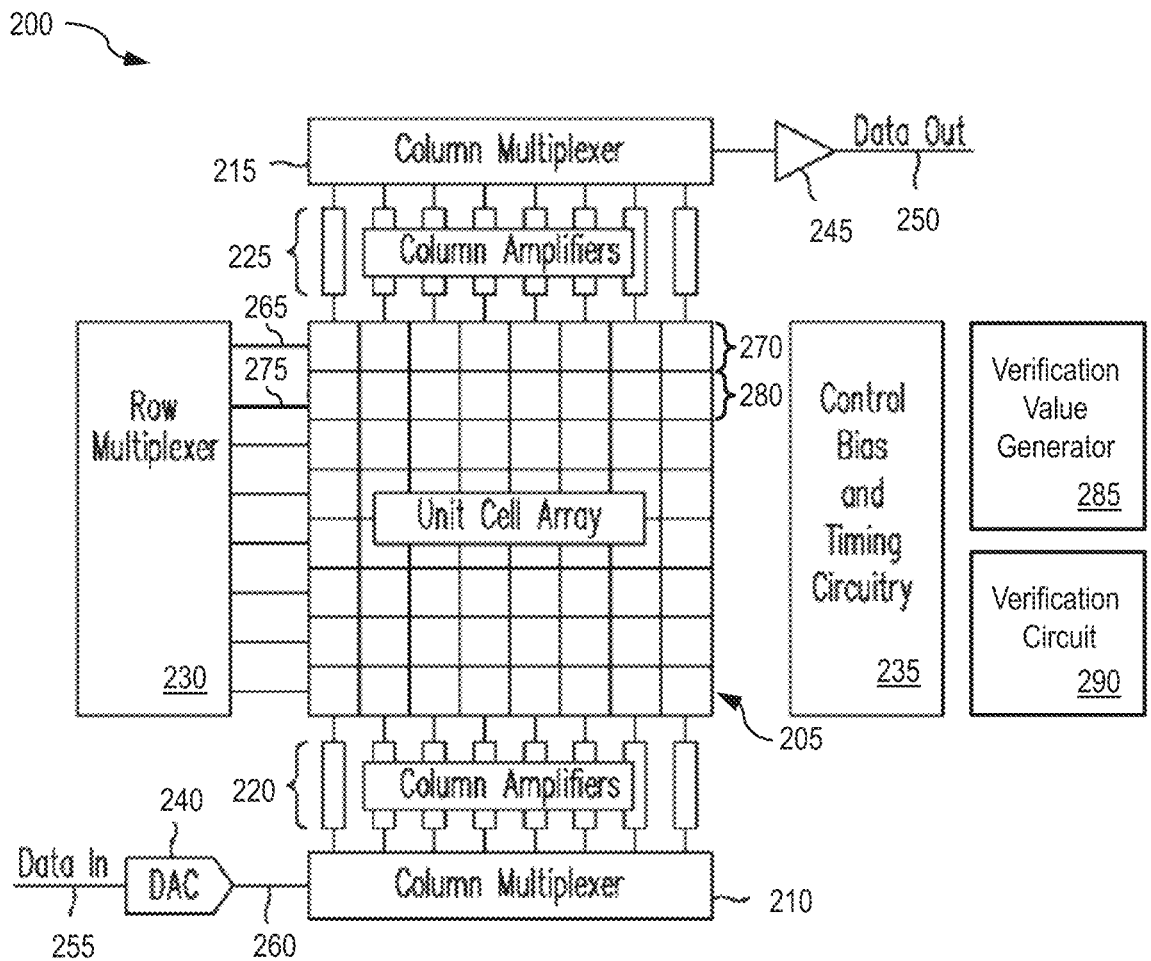
FIG. 2 illustrates a block diagram of an example image sensor assembly in accordance with one or more embodiments of the present disclosure.

FIG. 2 illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be an FPA, for example, implemented as the image capture component 115 of FIG. 1.

The image sensor assembly 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. In some aspects, operations of and/or pertaining to the unit cell array 205 and other components may be performed according to a system clock and/or synchronization signals (e.g., line synchronization (LSYNC) signals). The unit cell array 205 includes an array of unit cells. In an aspect, each unit cell may include a detector (e.g., a pixel) and interface circuitry. The interface circuitry of each unit cell may provide an output signal, such as an output voltage or an output current, in response to a detection signal (e.g., detection current, detection voltage) provided by the detector of the unit cell. The output signal may be indicative of the magnitude of EM radiation received by the detector and may be referred to as image pixel data or simply image data. The column multiplexer 215, column amplifiers 220, row multiplexer 230, and data output buffer 245 may be used to provide the output signals from the unit cell array 205 as a data output signal on a data output line 250. The output signals on the data output line 250 may be provided to components downstream of the image sensor assembly 200, such as processing circuitry (e.g., the processing component 105 of FIG. 1), memory (e.g., the memory component 110 of FIG. 1), display device (e.g., the display component 130 of FIG. 1), and/or other component to facilitate processing, storage, and/or display of the output signals. The data output signal may be an image formed of the pixel values for the image sensor assembly 200. In this regard, the column multiplexer 215, the column amplifiers 220, the row multiplexer 230, and the data output buffer 245 may collectively provide an ROIC (or portion thereof) of the image sensor assembly 200. In an aspect, the interface circuitry may be considered part of the ROIC, or may be considered an interface between the detectors and the ROIC. In an embodiment, components of the image sensor assembly 200 may be implemented such that the unit cell array 205 is hybridized to (e.g., bonded to, joined to, mated to) the ROIC. An example of such a hybridization is described with respect to FIG. 3.

The column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing)

through which digital signals from the unit cell array 205 traverses to get to the column multiplexer 215. As another example, the column amplifiers 225 may include an ADC for converting analog signals to digital signals (e.g., to obtain digital count values). These digital signals may be provided to the column multiplexer 215. In an aspect, the column amplifiers 225 may clip digital count values to a lowest soft saturation value associated with the unit cell array 205.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., IR light) incident on the detectors of the unit cells. In an aspect, the control bias and timing circuitry 235 may be, may include, or may be a part of, a logic circuit.

The control bias and timing circuitry 235 may generate control signals for addressing the unit cell array 205 to allow access to and readout of image data from an addressed portion of the unit cell array 205. The unit cell array 205 may be addressed to access and readout image data from the unit cell array 205 row by row, although in other implementations the unit cell array 205 may be addressed column by column or via other manners.

The control bias and timing circuitry 235 may generate bias values and timing control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. For example, the DAC 240 may drive digital control signals (e.g., provided as bits) to appropriate analog signal levels for the unit cells. In some technologies, a digital control signal of 0 or 1 may be driven to an appropriate logic low voltage level or an appropriate logic high voltage level, respectively. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the processing component 105 and/or imaging capture component 115 of FIG. 1.

In an embodiment, the image sensor assembly 200 may be implemented as part of an imaging system (e.g., 100). In addition to the various components of the image sensor assembly 200, the imaging system may also include one or more processors, memories, logic, displays, interfaces, optics (e.g., lenses, mirrors, beamsplitters), and/or other components as may be appropriate in various implementations. In an aspect, the data output signal on the data output line 250 may be provided to the processors (not shown) for further processing. For example, the data output signal may be an image formed of the pixel values from the unit cells of the image sensor assembly 200. The processors may perform operations such as non-uniformity correction, spatial and/or temporal filtering, and/or other operations. The images (e.g., processed images) may be stored in memory (e.g., external to or local to the imaging system) and/or displayed on a display device (e.g., external to and/or integrated with the imaging system). The various components of FIG. 2 may be implemented on a single chip or multiple chips. Furthermore, while the various components are illustrated as a set of individual blocks, various of the blocks may be merged together or various blocks shown in FIG. 2 may be separated into separate blocks.

It is noted that in FIG. 2 the unit cell array 205 is depicted as an 8×8 (e.g., 8 rows and 8 columns of unit cells. However, the unit cell array 205 may be of other array sizes. By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 205 may represent a pixel.

Figure 3:
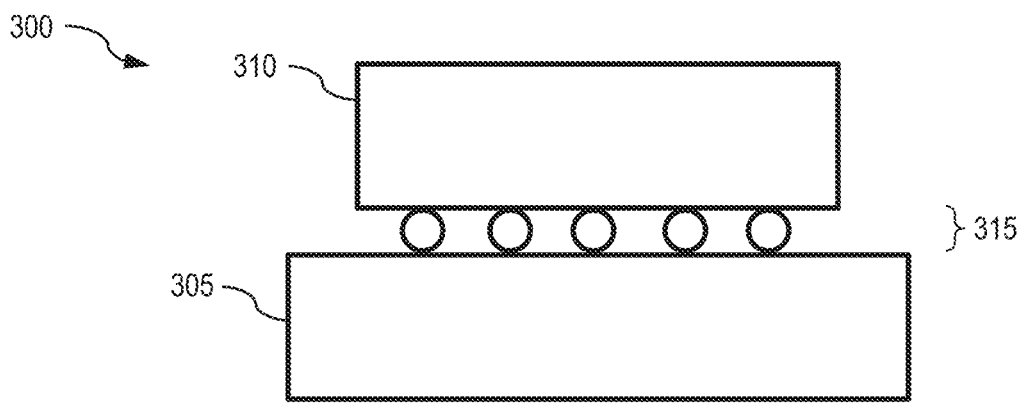
FIG. 3 illustrates an example image sensor assembly in accordance with one or more embodiments of the present disclosure.

In an embodiment, components of the image sensor assembly 200 may be implemented such that a detector array is hybridized to (e.g., bonded to) a readout circuit. For example, FIG. 3 illustrates an example image sensor assembly 300 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 300 may be, may include, or may be a part of the image sensor assembly 200.

The image sensor assembly 300 includes a device wafer 305, a readout circuit 310, and contacts 315 to bond (e.g., mechanically and electrically bond) the device wafer 305 to the readout circuit 310. The device wafer 305 may include detectors (e.g., the unit cell array 205). The contacts 315 may bond the detectors of the device wafer 305 and the readout circuit 310. The contacts 315 may include conductive contacts of the detectors of the device wafer 305, conductive contacts of the readout circuit 310, and/or metallic bonds between the conductive contacts of the detectors and the conductive contacts of the readout circuit 310. In one embodiment, the device wafer 305 may be bump-bonded to the readout circuit 310 using bonding bumps (e.g., indium bumps). The bonding bumps may be formed on the device wafer 305 and/or the readout circuit 310 to allow connection between the device wafer 305 and the readout circuit 310. In an aspect, hybridizing the device wafer 305 to the readout circuit 310 may refer to bonding the device wafer 305 (e.g., the detectors of the device wafer 305) to the readout circuit 310 to mechanically and electrically bond the device wafer 305 and the readout circuit 310.

In some embodiments, visual representations of captured data, such as infrared image data, may be generated according to user-defined palettes. For explanatory purposes, the user-defined palettes are used to visually represent captured infrared image data, although such palettes may be used on image data in other wavebands. Infrared images (e.g., thermal infrared images) of a scene may be used for monitoring, inspection, and maintenance purposes. The imaging system may capture infrared image data indicative of an intensity of infrared energy received from the scene and generate an infrared image that provides a visual representation of the captured infrared data. The infrared image may be generated from the infrared data by processing the infrared data using a palette. By applying a palette to infrared data values to generate an image, the image may have a one-to-one correspondence between colors and temperatures (or, equivalently, infrared intensity levels) observed from the scene. In some aspects, such colorization may be referred to as isotherm colorization, in which pixels having the same temperature are assigned the same color.

A palette may be defined to map infrared image data values output by each pixel to corresponding visual representation values. Visual representation values may refer to color values (e.g., RGB color values) and grayscale values. In an aspect, the infrared image data values of the pixels are indicative of temperatures of features in a scene captured by the pixels, and thus the palette maps the temperatures of the features in the scene to corresponding visual representation values. In some cases, a palette may be provided/stored as a lookup table that includes correspondences between image data values and visual representation values. In some cases, the infrared image data may be provided as digital count values (e.g., output from ADCs coupled to corresponding detectors) or, equivalently, temperature values corresponding to the digital count values. In some embodiments, the palette may define one or more colorized regions and/or one or more grayscale regions. A mapping between image data values and visual representation values defined by the palette is generally based on application and, in some cases, aesthetics. As one example, for a human detection application, the palette may be defined to provide temperatures around 98.6° F. (e.g., between 95° F. and 105° F.) in color and provide temperatures farther from 98.6° F. in grayscale (e.g., below 95° F. and above 105° F.).

Figure 4:
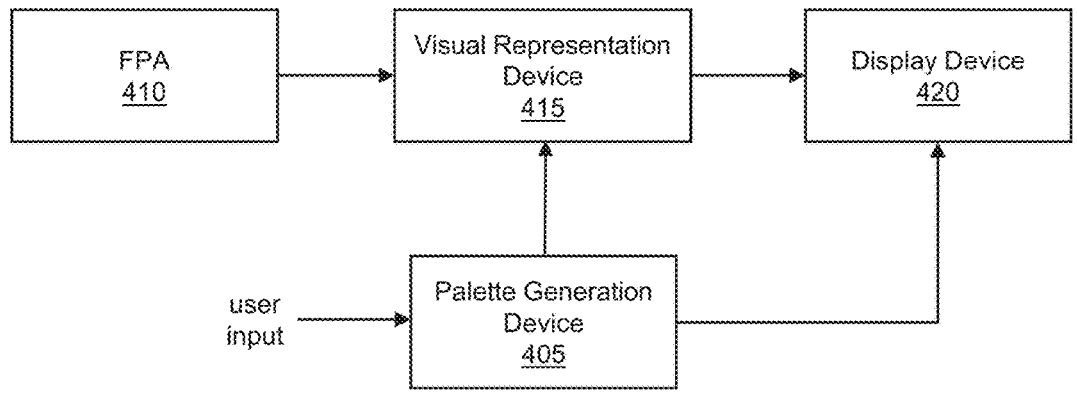
FIG. 4 illustrates an example system for facilitating palette generation and associated infrared image generation in accordance with one or more embodiments of the present disclosure.

FIG. 4 illustrates an example system 400 for facilitating palette generation/definition and associated infrared image generation in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The system 400 includes a palette generation device 405, an FPA 410, a visual representation device 415 (e.g., also referred to as a mapping device or a colorization device), and a display device 420. In an embodiment, the palette generation device 405, the FPA 410, and/or the visual representation device 415 may be implemented using one or more processing circuits on a single chip or distributed across two or more chips.

The palette generation device 405 generates palettes. The palette generation device 405 may cause the display device 420 to display graphical user interfaces (GUIs) appropriate for receiving user input to define palettes. In some embodiments, to facilitate defining of a palette, the user may provide user input indicative of threshold values to divide a range into regions and a respective visual representation mode for each region. Each region is bound by at least one threshold value. In an aspect, the user input may include threshold temperature values to divide a temperature range into temperature regions. In an embodiment, the palette generation device 405 may be implemented by the processing component 105 of FIG. 1.

To facilitate generation of a palette, the GUI may provide one or more windows. Each window may have/present one or more input fields (e.g., also referred to simply as fields) for receiving the user input. The user input may be received via clicking (e.g., using a mouse, stylus, finger, etc.), keyboard entry (e.g., for text and numbers), gesture entry (e.g., for touch screens), voice entry (e.g., for imaging systems with voice recognition), and/or other manners to receive input from the user. By way of non-limiting examples, an input field may include a text input field, a checkbox, a radio button, a slider, or a drop-down menu.

As a non-limiting example, the user may define five threshold values (e.g., five threshold temperatures) to divide an output temperature range into six distinct regions. For a given pixel of the FPA 410, a temperature $T_{pixel}$ captured by the pixel may fall within one of the six regions:

Region 1: $T_{pixel} \leq T_{th0}$,
Region 2: $T_{th0} < T_{pixel} \leq T_{th1}$,
Region 3: $T_{th1} < T_{pixel} \leq T_{th2}$,
Region 4: $T_{th2} < T_{pixel} \leq T_{th3}$,
Region 5: $T_{th3} < T_{pixel} \leq T_{th4}$,
Region 6: $T_{th4} < T_{pixel}$, where $T_{th0}$, $T_{th1}$, $T_{th2}$, $T_{th3}$, and $T_{th4}$ are the five threshold temperatures in which $T_{th0} < T_{th1} < T_{th2} < T_{th3} < T_{th4}$. The threshold temperatures $T_{th0}$ and $T_{th1}$ may be referred to as a minimum temperature and a maximum temperature, respectively, that can be represented in an infrared image generated using the palette. It is noted that the threshold temperatures $T_{th0}$ and $T_{th1}$ may be referred to as adjacent threshold temperatures, the threshold temperatures $T_{th1}$ and $T_{th2}$ may be referred to as adjacent threshold temperatures, and so forth. In some aspects, the minimum temperature and/or maximum temperature are fixed by the imaging system 100 and cannot be set by the user.

For explanatory purposes, the output range is provided in temperature units, although the output range may also, alternatively or in addition, be provided in counts, percentage of a full range of the output range, and/or other appropriate mappings/associations between data outputs generated by the detectors and corresponding temperatures. As an example of percentage of the full range, if a temperature range from −20° C. to 180° C. is to be represented by the palette, a temperature of 30° C. would be at the 25% point of the full 200° C. range to be represented.

It is noted that the minimum temperature and the maximum temperature that can be represented in the infrared image may, but need not, coincide with a minimum temperature and a maximum temperature, respectively, that can be reliably detected by the detectors of the detector array. For example, the maximum temperature that the user specifies may be set to a lower temperature than a saturation temperature of the detectors.

A palette maps (e.g., assigns, corresponds) each value (e.g., temperature unit or, equivalently, digital count values, percentages of full range, etc.) to a corresponding visual representation value. For a given region, the user input may specify whether the region is a color region (e.g., region represented using a color mode) or a grayscale region (e.g., region represented using a grayscale mode). In some cases, the user may set a region to be a color region by setting a color value for each threshold value that define/bound the region. In this regard, a threshold value can be referred to as an endpoint or a boundary of a region. In some cases, the user may set a region to be a grayscale region by setting a grayscale value for each threshold value that define/bound the region. In some cases, the user may specify that the region be a grayscale region, and the palette generation device 405 may determine grayscale values that correspond to the region. Other parameters that the user may associate with a defined palette may include whether to set a spot meter, whether to display a color bar (e.g., also referred to as a color legend), whether to present the color bar with temperature values or percentage values (e.g., percentage of a temperature value relative to an entire temperature range of an image).

With continued reference to the above example, the user may define a visual representation value associated with the minimum temperature $T_{th0}$, a visual representation value associated with the threshold temperatures $T_{th1}$, $T_{th2}$, and/or $T_{th3}$, and a visual representation value associated with the maximum temperature $T_{th4}$. In some aspects, between these visual representation values at the threshold temperatures defined by the user, the palette generation device 405 may perform interpolation (e.g., HSV interpolation) on each pair of visual representation values associated with adjacent threshold temperatures (e.g., $T_{th1}$ and $T_{th2}$ is a pair of adjacent threshold temperatures) to obtain interpolated visual representation values to represent temperatures between the pair of adjacent threshold temperatures. In some cases, such interpolation may be performed when the visual representation values at the adjacent threshold temperatures are color values. In some cases, the user may specify that a region be a grayscale region, and the palette generation device 405 may determine grayscale values that correspond to the region. In these cases, the user might not directly set a grayscale value at a threshold temperature.

In one case, for a region, the palette may define that visual representation of data values that fall within that region may involve mapping the pixel data values to visual representation values determined by linearly interpolating from two specified endpoint visual representation values. For a color region, interpolation may be based on RGB color values, HSV color values, or others. As an example, for Region 1, temperatures below the threshold temperature $T_{th0}$ map to the visual representation value associated with the threshold temperature $T_{th0}$. For Regions 2, 3, and 4, a linear interpolation may be performed between the visual representation values associated with the bounding thresholds. For example, if $T_{th3}=100°$ C., $T_{th4}=200°$ C., a color value $RGB_{Tth3}=(255, 128, 0)$, and $RGB_{Tth4}=(255, 0, 0)$, a feature having a temperature of 125° C. (within Region 4) maps to (255, 96, 0). For Region 5, temperatures above the threshold temperature $T_{th4}$ map to the visual representation value associated with the threshold temperature $T_{th4}$. As another example, the palette generation device 405 may convert the RGB values associated with the threshold temperatures to the equivalent HSV values and interpolate in the HSV color space.

The palette defined by the user (e.g., and facilitated by interpolation performed by the palette generation device 405) may be stored (e.g., in the memory component 110 of the imaging system 100), such that the user does not need to redefine this same palette in the future. In some aspects, palettes generated by one or more users and/or predefined palettes (e.g., defined by a manufacturer of the imaging system and/or an app installed on the imaging system) may be stored. The user may select a palette used to represent infrared data values using color and/or grayscale from among these stored palettes. An example display screen for facilitating palette generation is described with respect to FIG. 5. Examples of different palettes and images colored using these palettes are described with respect to FIGS. 6A-6C, 7A-7C, and 8A-8C.

The FPA 410 includes a detector array and an ROIC. The FPA 410 receives light from a scene and generates infrared data values (e.g., thermal infrared data values) based on the light (e.g., infrared component of the light). For example, the FPA 410 may include or may be coupled to an ADC circuit that generates infrared data values based on infrared radiation. A 16-bit ADC circuit may generate infrared data values that range from 0 to 65,535. In an aspect, the detector array is an infrared detector array (e.g., microbolometer array) that detects IR radiation (e.g., thermal IR radiation). In an embodiment, the FPA 410 may be implemented by the imaging capture component 115.

The visual representation device 415 receives a palette from the palette generation device 405 and the infrared data values from the FPA 410 and applies the palette to the infrared data values to generate an infrared image. In an aspect, applying the palette may be referred to as colorizing (e.g., using color values and/or gray scale values) the infrared data values. In some cases, the user may define a palette to be used by the visual representation device 415 or select from a stored palette (e.g., a predefined palette or a palette previously defined by this user or another user). The palette defines regions (e.g., temperature regions) and visual representation values (e.g., color values or grayscale values) for each temperature region. In this regard, the visual representation device 415 may map the infrared data values to color values or grayscale values according to the palette received by the visual representation device 415. It is noted that, although the FPA 410 and the visual representation device 415 are depicted as separate components in FIG. 4, the visual representation device 415 may be, or may be considered to be, part of the FPA 410, such that the FPA 410 outputs infrared images generated by applying a palette to infrared data values captured by the FPA 410. In an embodiment, the visual representation device 415 may be implemented by the processing component 105 of FIG. 1.

The display device 420 displays GUIs appropriate for receiving user input to define palettes. The display device 420 also receives the infrared image from the visual representation device 415 and displays the infrared image (e.g., to the user and/or other viewers). More generally, images output by the visual representation device 415 may be provided for display using the display device 420, storage (e.g., using the memory component 110), and/or further processing (e.g., prior to display). In an embodiment, the display device 420 may be, may include, or may be a part of, the display component 130.

Figure 5:
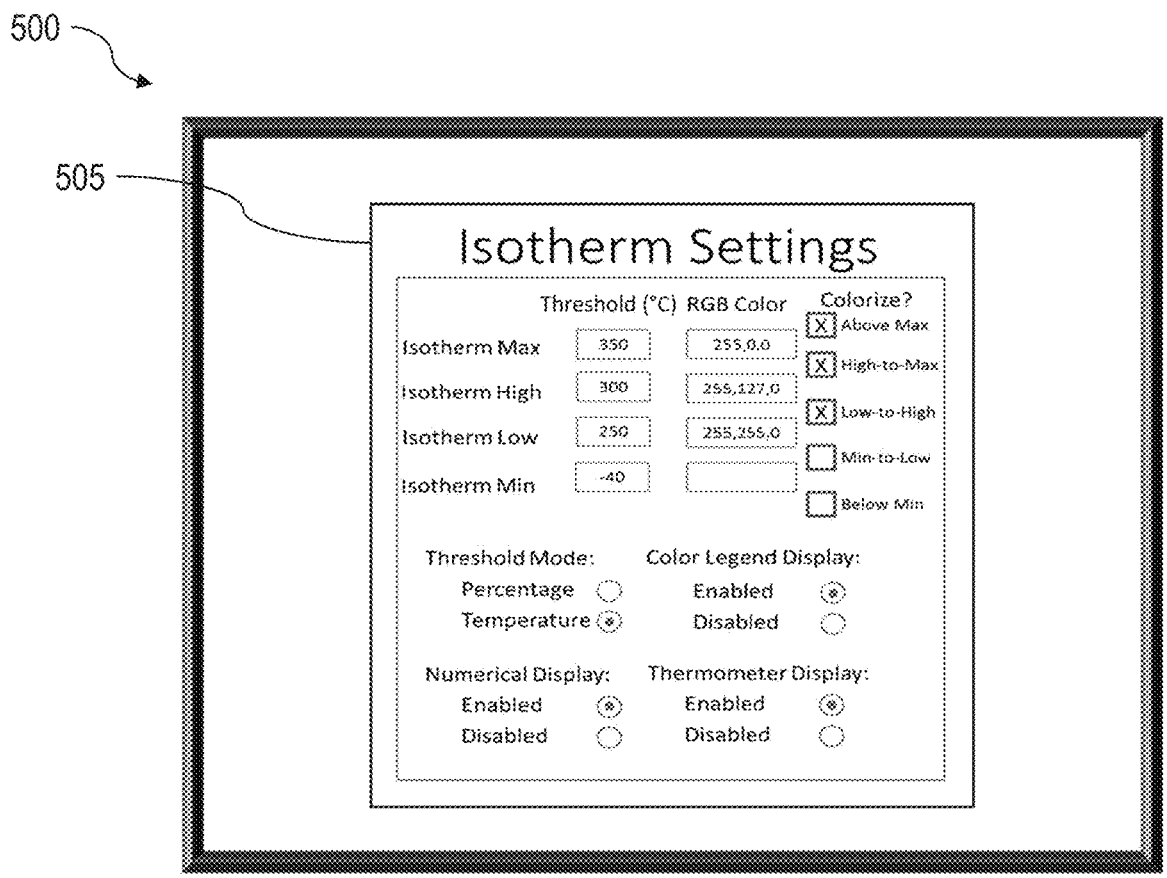
FIG. 5 illustrates an example display screen of an imaging system with a graphical user interface window displayed thereon in accordance with one or more embodiments of the present disclosure.

FIG. 5 illustrates an example display screen 500 of an imaging system (e.g., the imaging system 100) with a GUI window 505 displayed thereon in accordance with one or more embodiments of the present disclosure. In an aspect, the GUI window 505 provides an interface for receiving user input to facilitate defining of a palette. In this regard, the GUI window 505 provides input fields for receiving the user input. The input fields include fields (e.g., fill-in fields) for receiving threshold temperatures. In the GUI window 505, fill-in fields are filled by the user with the threshold temperatures −40° F., 250° F., 300° F., and 350° F. The threshold temperature −40° F. is a minimum temperature that can be represented in an infrared image. The threshold temperature 350° F. is a maximum temperature that can be represented in the infrared image. In some cases, the GUI window 505 may be adjusted by the user to allow the user to provide fewer or more than four threshold temperatures.

The four temperature thresholds provided by the user divides an output temperature range (e.g., −40° F. to 350° F.) into five temperature regions. The five temperature regions include a region associated with temperatures at or less than −40° F., a region associated with temperatures between −40° F. and 250° F., a region associated with temperatures between 250° F. and 300° F., a region associated with temperatures between 300° F. and 350° F., and a region associated with temperatures at and above 350° F. In some implementations, the minimum temperature and/or the maximum temperature may be fixed (e.g., not adjustable by the user).

The input fields of the GUI window 505 also include fields (e.g., fill-in fields) to identify whether and how to represent (e.g., using color values or grayscale values) each temperature region. The user specifies endpoint RGB color values (255, 0, 0), (255, 127, 0), and (255, 255, 0) at endpoints 250° F., 300° F., and 350° F., respectively. The user specifies no endpoint color value for −40° F. In addition, the input fields include fields (e.g., check box fields) to specify representation associated with each temperature region. In FIG. 5, not specifying the endpoint color value for −40° F. in the appropriate fill-in field and not checking the check box fields labeled "Min-to-Low" and "Below Min" together indicate that the region between −40° F. and 250° F. and the region below −40° F. are to be provided/colored using grayscale values. In some cases, the user's filling in of endpoint color values in the fill-in fields may cause corresponding check box fields to be automatically checked by the imaging system 100. As shown in FIG. 5, the user specifies that features in the image having temperatures above the maximum temperature (e.g., above 350° F.) are to be represented using color values, temperatures between 300° F. and 350° F. are to be represented using color values, temperatures between 250° F. and 300° F. are to be represented using color values, temperatures between −40° F. and 250° F. are to be represented using grayscale values, and temperatures below −40° F. are to be represented using grayscale values.

Although decimal values are used in FIG. 5, alternatively or in addition, the color values may be represented using a string of bits, hexadecimal values, and/or other representations. In some cases, the imaging system may cause the display screen 500 to display a pictorial representation (e.g., a color picker dialog box presenting a pictorial color chart) to the user when the user selects the fill-in fields for filling in the color values. In this manner, the user need not be familiar with the numerical/coordinate values associated with different colors.

The GUI window 505 also includes fields (e.g., circular option/radio buttons) for the user to specify whether to provide threshold temperatures as temperatures or percentages (e.g., percentage in relation to a temperature range between −40° F. and 350° F.), whether or not to provide a numerical display, whether or not to provide a color legend display, and whether or not to provide a thermometer display.

It is noted that the GUI window 505 provides one non-limiting example combination of input fields (e.g., fill-in fields, check box fields, etc.) for defining a palette. GUI windows with a different combination of input fields may be presented to the user. In some cases, the imaging system may have multiple GUI windows from which the user selects. For example, different GUI windows may be intended for different applications (e.g., surveillance applications, firefighting applications), different levels of user experience (e.g., user having higher expertise may have options that facilitate finer control), and so forth. Although the GUI window 505 provides an interface appropriate for the user to provide four temperature thresholds and identify whether/how to represent data values in each region, such an interface is provided by way of non-limiting example. Other interfaces may be used to allow the user to provide fewer or more than four temperature thresholds. For example, an interface may allow the user to define a number of temperature thresholds the user desires to define.

In some aspects, the user may selectively display the GUI window 505 on the display screen 500 while an image (e.g., thermal infrared image) is displayed on the display screen 500, such as to allow real-time adjustment of the palette and corresponding adjustment to the image. In some cases, the imaging system may include or may be coupled to multiple display screens. The same or different screens may be used to display the image and the GUI window 505.

FIG. 6A illustrates an example display screen 600 with an infrared image 605 displayed thereon in accordance with one or more embodiments of the present disclosure. The display screen 600 may be provided for viewing by a user of the imaging system. In an embodiment, the display screen 600 may be provided as part of or otherwise coupled to an imaging system (e.g., the imaging system 100). The display screen 600 may be, may include, or may be a part of the display component 130 of FIG. 1.

The infrared image 605 has a color bar 610, a spot meter indicator 615 associated with a spot meter of the imaging system, a temperature value 620 associated with the spot meter, a thermometer bar 625 associated with the spot meter, and a battery indicator 630 of the imaging system overlaid thereon. The color bar 610 provides a representation of the mapping between a color of a pixel of the infrared image 605 and a temperature associated with that pixel. Numeric labels for temperatures are provided adjacent to the thermometer bar 625. In an aspect, a location, size (e.g., text size, bar height, and bar width), and/or some other characteristic of the color bar 610, the spot meter indicator 615, the temperature value 620, the thermometer bar 625, and/or the battery indicator 630 may be adjustable by the user. In some cases, the user may set a default location (e.g., on the display screen 600 and/or the image displayed on the display screen 600) and a default size for the color bar 610, the spot meter indicator 615, the temperature value 620, the thermometer bar 625, and/or the battery indicator 630.

In some cases, rather than overlaying the color bar 610, the spot meter indicator 615, the temperature value 620, the thermometer bar 625, and/or the battery indicator 630 on the infrared image 605, the color bar 610, the spot meter indicator 615, the temperature value 620, the thermometer bar 625, and/or the battery indicator 630 may be provided on portions of the display screen 600 outside the infrared image 605 when such screen real estate is available. In some cases, the user may be able to select which of the color bar 610, the spot meter indicator 615, the temperature value 620, the thermometer bar 625, and/or the battery indicator 630 to display or not display to the user. In some cases, the user may tie settings relating to a location, size (e.g., text size, bar height, and bar width), whether or not to display, and/or some other characteristic of the color bar 610, the spot meter indicator 615, the temperature value 620, the thermometer bar 625, and/or the battery indicator 630 to a palette. In other cases, the user may apply these settings to all palettes (e.g., the settings are independent of the palette used to generate an image).

An enlarged and annotated view of the color bar 610 is shown in FIG. 6B. For explanatory purposes, the infrared image 605 may be generated by applying (e.g., to image data values captured by an FPA of the imaging system) the palette as defined by the user using the GUI window 505 with the input fields filled out as shown in FIG. 5. The temperature range from −40° C. to 350° C. is divided into five regions using four threshold temperatures −40° C., 250° C., 300° C., and 350° C. These regions include regions 635, 640, and 645, as shown in the color bar 610 of FIG. 6B, a region for temperatures below −40° C., and a region for temperatures above 350° C. The region 635 includes the temperature range from −40° C. to 250° C. and provides representations of temperatures within this temperature range in grayscale. The region 640 includes the temperature range from 250° C. to 300° C., with a starting color at 250° C. set to yellow, an ending color at 300° C. set to orange, and interpolation (e.g., HSV interpolation) between the starting color and the ending color for temperatures between 250° C. and 300° C. The region 645 includes the temperature range from 300° C. to 350° C., with a starting color at 300° C. set to orange (e.g., the starting point/color for the third region is the ending point/color for the second region), an ending color at 350° C. set to red, and interpolation between the starting color and the ending color for temperatures between 300° C. and 350° C. In an aspect, the region 635 may be referred to as a grayscale region and represented using a grayscale representation mode (e.g., also referred to simply as a grayscale mode), the regions 640 and 645 may be referred to as color regions using color representation modes (e.g., also referred to as color modes), the region for temperatures below −40° C. may be referred to as a grayscale region, and the region for temperatures above 350° C. may be referred to as a color region. It is noted that, as shown in the color bar 610, a height of a region need not be proportional to a range in temperature of the region. For example, in the color bar 610, a height of the region 635 associated with the temperature range from −40° C. to 250° C. is around the same as a height of the region 640 associated with the temperature range from 250° C. to 300° C. In some cases, a height associated with each region may be specified by the user.

The threshold temperature −40° C. may be referred to as a minimum temperature and the threshold temperature 350° may be referred to as a maximum temperature. In some cases, the user may specify that features with temperatures below the minimum temperature −40° C. may be represented in the infrared image 605 using the same visual representation value used to represent features with temperatures at the minimum temperature −40° C., and/or features with temperatures above the maximum temperature 350° C. may be represented in the infrared image 605 using the same visual representation value used to represent features with temperatures at the maximum temperature 350° C.

In an aspect, the palette defined in FIG. 5 may be used to emphasize hot-extreme colors by using grayscale for low temperature (e.g., to decrease emphasis of low temperature features) and progressively more vibrant colors as temperature increases. For example, the color yellow (e.g., the color for the temperature threshold 250° C.) may generally be perceived (e.g., by a human) to be associated with lower temperature than the color orange (e.g., the color for the temperature threshold 300° C.), the color orange may generally be perceived to be associated with lower temperature than the color red (e.g., the color for the temperature threshold 350° C.), and the grayscale may generally be perceived to be less/not of interest compared to colored portions of the infrared image 605.

FIG. 6C illustrates example indicators 650, 655, 660, and 665 of the endpoint colors associated with the temperature thresholds −40° C., 250° C., 300° C., and 350° C., respectively. In this regard, the indicator 650 may be used to indicate that the threshold temperature −40° C. and its adjacent threshold temperature 250° C. are boundaries of a grayscale region (e.g., the region 635), the indicator 655 may be a circle filled in with a yellow color to indicate that the threshold temperature 250° C. is set to yellow, the indicator 660 may be a circle filled in with an orange color to indicate that the threshold temperature 300° C. is set to orange, and the indicator 665 may be a circle filled in with a red color to indicate that the threshold temperature 350° C. is set to red. In some aspects, the indicators 650, 655, 660, and 665 may be overlaid on the infrared image 605 in the display screen 600 and/or positioned outside of the infrared image 605 (e.g., to the right of the color bar 610 in FIG. 6A). In some cases, the indicators 650, 655, 660, and 665 may be displayed to the user (e.g., on the display screen 600 and/or elsewhere) may be user selectable (e.g., user clicks on an indicator with a mouse cursor, tap gesture using the user's finger or appropriate stylus, etc.) to allow the user to adjust the endpoint color values. As an example, the user may click the indicator 660 to cause an interface that allows the user to set the color value for the threshold temperature 300° C. In this example, the interface may be the GUI window 505, a window limited to providing an appropriate field(s) to set the color value for the threshold temperature 300° C., and/or other interface appropriate to set the color value for the threshold temperature 300° C.

With reference back to FIG. 6A, the spot meter of the imaging system is positioned at a center of the infrared image 605, as indicated by the spot meter indicator 615. In some cases, the spot meter may be positioned (e.g., by default) at the center of the infrared image 605. In some cases, a location and/or a size of the spot meter may be specified by the user (e.g., a user-specified region of interest). As represented pictorially by the spot meter indicator 615, the spot meter encompasses multiple pixels. The location of the spot meter may be provided as row and column coordinates. For example, a location of the spot meter may be defined by row and column coordinates for a lowest-left pixel and a highest-right pixel. Although the spot meter in FIG. 6A is provided as a square region, the spot meter may be of other shapes, such as rectangular, triangular, circular, or other shape.

Various characteristics and statistics associated with the spot meter may be provided to the user, such as the location of the pixels, mean temperature of the pixels, a standard deviation and/or variance of the temperature of the pixels, a lowest temperature value among these pixels, a highest temperature value among these pixels, a location of the pixel having the lowest temperature value, and a location of the pixel having the highest temperature value. The temperature value 620 provides a temperature associated with the spot meter indicator 615 and the thermometer bar 625 provides a pictorial representation of the temperature value 620. For example, the temperature value 620 may be an average temperature of the pixels encompassed by the spot meter. In some cases, alternatively or in addition, a percentage value associated with the temperature value 620 may be overlaid on the infrared image 605. The percentage value may be around 93.6%, since 325° C. is at around the 93.6% point along the entire range from −40° C. to 350° C. In some cases, a spot meter feature may be optional.

FIG. 7A illustrates an example display screen 700 with an infrared image 705 displayed thereon in accordance with one or more embodiments of the present disclosure. The display screen 700 may be provided for viewing by the user of the imaging system. In an embodiment, the display screen 700 may be provided as part of or otherwise coupled to an imaging system (e.g., the imaging system 100). The display screen 700 may be, may include, or may be a part of the display component 130 of FIG. 1.

The infrared image 705 has a color bar 710, a spot meter indicator 715 associated with a spot meter of the imaging system, a temperature value 720 associated with the spot meter, a thermometer bar 725 associated with the spot meter, and a battery indicator 730 of the imaging system overlaid thereon. FIG. 7B illustrates an enlarged and annotated view of the color bar 710 of FIG. 7A. FIG. 7C illustrates example indicators 750, 755, 760, and 765 of endpoint colors associated with percentage thresholds 0%, 20%, 80%, and 100%, respectively, of the color bar 710. The description of FIGS. 6A through 6C generally apply to FIGS. 7A through 7C, with examples of differences and other description provided herein.

The temperature value 720 provides a temperature associated with the spot meter indicator 715 and the thermometer bar 725 provides a pictorial representation of the temperature value 720. In some cases, alternatively or in addition, a percentage value associated with the temperature value 720 may be overlaid on the infrared image 705. The percentage value may be around 50% since 30° C. is at around the half-way point of the temperature bar 725 or, equivalently, the half-way point of the color bar 710.

As shown in FIG. 7B, a temperature range (e.g., represented as percentages of an entire temperature range) is divided into five regions using threshold percentages 0%, 20%, 80%, and 100%. These ranges include regions 735, 740, and 745 as shown in the color bar 710 of FIG. 7B, a region for temperatures below 0%, and a region for temperatures above 100%. The region 735 includes the range from 0% to 20%, with a starting color at 0% set to dark blue, an ending color at 20% set to light blue, and interpolation (e.g., HSV interpolation) between the starting color and the ending color for intermediate percentages. The region 740 includes the range from 20% to 80% and provides representations of temperatures corresponding to this range in grayscale. The region 745 includes the range from 80% to 100%, with a starting color at 80% set to orange, an ending color at 100% set to yellow, and interpolation between the starting color and the ending color for intermediate percentages. In some aspects, 0% and 100% correspond to a minimum temperature and maximum temperature, respectively, that can be represented in the infrared image 705. Features having temperatures below the minimum temperature may be mapped to the same color value (e.g., the dark blue color set for 0%) as features at the minimum temperature. Features having temperatures above the maximum temperature may be mapped to the same color value (e.g., the yellow color set for 100%) as features at the maximum temperature. FIG. 7C illustrates the indicators 750, 755, 760, and 765 of the endpoint colors associated with the thresholds 0%, 20%, 80%, and 100%, respectively. Although FIG. 7C does not include an indicator(s) associated with the grayscale region, in some cases an indicator(s) may be used to identify a region(s) and/or threshold temperature(s) associated with grayscale values.

In an aspect, the palette used to generate the infrared image 705 may be used to emphasize low-extreme colors (e.g., also referred to as cold-extreme colors) and hot-extreme colors by using bluish colors at low temperatures, orangish/yellowish colors at high temperatures, and grayscale between the low- and hot-extremes (e.g., to decrease emphasis of features between the low- and hot-extremes. For example, bluish colors may generally be perceived to be cold temperatures, darker blue colors may generally be perceived to be colder than lighter blue colors, and grayscale may be generally perceived to be less/not of interest compared to colored portions of the infrared image 705. In an aspect, the palette may be referred to as a minimum/maximum palette or as facilitating minimum/maximum detection.

FIG. 8A illustrates an example display screen 800 with an infrared image 805 displayed thereon in accordance with one or more embodiments of the present disclosure. The display screen 800 may be provided for viewing by the user of the imaging system. In an embodiment, the display screen 800 may be provided as part of or otherwise coupled to an imaging system (e.g., the imaging system 100). The display screen 800 may be, may include, or may be a part of the display component 130 of FIG. 1.

The infrared image 805 has a color bar 810, a spot meter indicator 815 associated with a spot meter of the imaging system, a temperature value 820 associated with the spot meter, a thermometer bar 825 associated with the spot meter, and a battery indicator 830 of the imaging system overlaid thereon. FIG. 8B illustrates an enlarged and annotated view of the color bar 810 of FIG. 8A. FIG. 8C illustrates example indicators 850 and 860 of endpoint colors associated with temperature thresholds 25° C. and 35° C., respectively, and an indicator 855 associated with a temperature between the temperature thresholds 25° C. and 35° C. The description of FIGS. 6A-6C and 7A-7C generally apply to FIGS. 8A through 8C, with examples of differences and other description provided herein.

The temperature value 820 provides a temperature associated with the spot meter indicator 815 and the thermometer bar 825 provides a pictorial representation of the temperature value 820. In some cases, alternatively or in addition, a percentage value associated with the temperature value 820 may be overlaid on the infrared image 805.

As shown in FIG. 8B, the temperature range is divided into five regions using threshold temperatures −40° C., 25° C., 35° C., and 550° C. These regions include regions 835, 840, and 845 as shown in the color bar 810 of FIG. 8B, a region for temperatures below −40° C., and a region for temperatures above 550° C. The regions 835 and 845 include the temperature ranges from −40° C. to 25° C. and from 35° C. to 550° C., respectively, and provide representations of temperatures corresponding to these temperature ranges in grayscale. As shown by the color bar 810, the region 835 is associated with different grayscale values than the region 845. The region 840 includes the range from 25° C. to 35° C., with a starting color at 25° C. set to yellow, an ending color at 35° C. set to red, an intermediate color between 25° C. and 35° C. set to orange, and an interpolation between the starting color and the ending color based on the intermediate color for intermediate temperatures. For example, the interpolation between the starting color and the ending color may include an interpolation between the starting color and the intermediate color to obtain a set of color values between 25° C. and an intermediate temperature corresponding to the intermediate color, and an interpolation between the intermediate color and the ending color to obtain a set of color values between the temperature intermediate temperature and 35° C. Features having temperatures below the minimum temperature of −40° C. may be mapped to the same grayscale value as features at the minimum temperature. Features having temperatures above the maximum temperature are mapped to the same grayscale value as features at the maximum temperature.

FIG. 8C illustrates the indicators 850 and 860 of the endpoint colors and the indicator 855 of the intermediate color. As shown by FIGS. 8A through 8C, one or more intermediate colors between a starting color and an ending color may be used to tune an interpolation performed by the imaging system. For example, the imaging system may perform the interpolation (e.g., HSV interpolation) from the starting color and the ending color by transitioning from the starting color to the intermediate color(s) and then from the intermediate color(s) to the ending color. In some cases, the intermediate color(s) may be user specified.

In an aspect, the palette used to generate the infrared image 805 may be used to emphasize scene features having temperatures within a certain temperature range (e.g., a temperature range of interest) by applying/mapping color values to features in this temperature range and applying/mapping grayscale values for temperatures outside (e.g., temperatures above and below) this temperature range. In FIGS. 8A and 8B, the temperature range of interest is encompassed by the region 840 and represented using color values, whereas the regions 835 and 845, the region below the minimum temperature, and the region above the maximum temperature are outside the temperature range of interest and represented using grayscale values. For example, the palette may be used to locate humans in infrared images. In an aspect, the palette may be referred to as a mid-temperature palette or as facilitating mid-temperature detection.

With regard to grayscale regions, as one example, a 16-bit grayscale data output by a camera pipeline may be compressed to an 8-bit grayscale using histogram equalization. This may be a non-linear mapping that provides more 8-bit values to more densely populated portions of the 16-bit histogram. As another example, 16-bit values that are colorized may get removed from the 16-bit histogram used to calculate an image transfer table to 8-bit grayscale. For example, in FIGS. 8A and 8B, the colorized region 840 is removed from the histogram, thus freeing up more 8-bit values to be used for grayscale regions. The additional 8-bit values allow more grayscale contrast to be provided for the regions represented in grayscale.

Thus, using various embodiments, users are provided with flexibility to adapt visual representation schemes to match an application(s). Although each of FIGS. 6A-6C, 7A-7C, and 8A-8C illustrate example palettes that define five distinct regions, palettes may define fewer than five regions or more than five regions.

Figure 9:
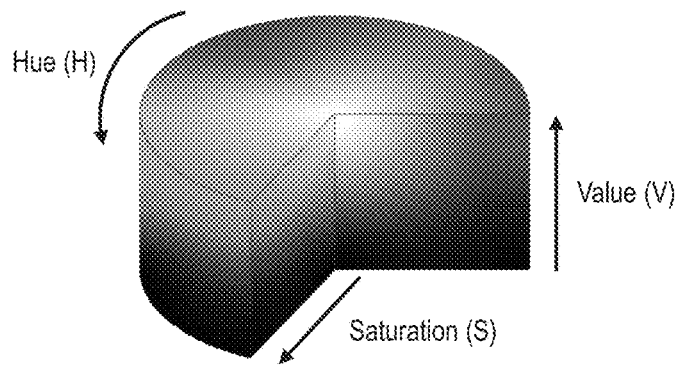
FIG. 9 illustrates a cylinder associated with a hue, saturation, value color space.

In one or more embodiments, HSV interpolation is used to interpolate color values between two colors (e.g., user-specified endpoint colors associated with threshold temperatures). In this regard, the HSV color space may be used to perform color interpolation to create (e.g., dynamically create) a lookup table based on a starting color and an ending color. In some cases, the HSV color space may be more amenable to creating a gradient between two colors (e.g., relative to the RGB color space). The HSV color space allows for the saturation and value to remain constant while changing only the hue. For example, in some implementations, the HSV color space may allow representing of colors on a color wheel in which the hue alone can be adjusted to move around the wheel (e.g., while the saturation and value remain constant). As an example, FIG. 9 illustrates a cylinder associated with the HSV color space. As shown in FIG. 9, the hue, saturation, and value coordinates are provided by an angular component/distance around the cylinder, a radial component/distance from the center of the cylinder, and a vertical component/distance from the base and along the height of the cylinder, respectively. The HSV color space may be oriented such that the three primary colors and three secondary colors are linearly mapped, allowing for a desired color saturation level and value to be readily translated through the possible color hues. The conversion between HSV values and RGB values is non-linear. As such, interpolation in the HSV space can result in a very different mapping than in the RGB space. In some cases, a user may enter endpoint colors in RGB values to an imaging system, and the imaging system may internally convert these endpoint colors to HSV values, perform interpolation in the HSV space, and create a lookup table (e.g., RGB lookup table) with a correct number of entries for display. Although various embodiments are described with regard to gradients created using HSV interpolation, other color spaces may be used to provide other gradients based on application.

Figure 10A:
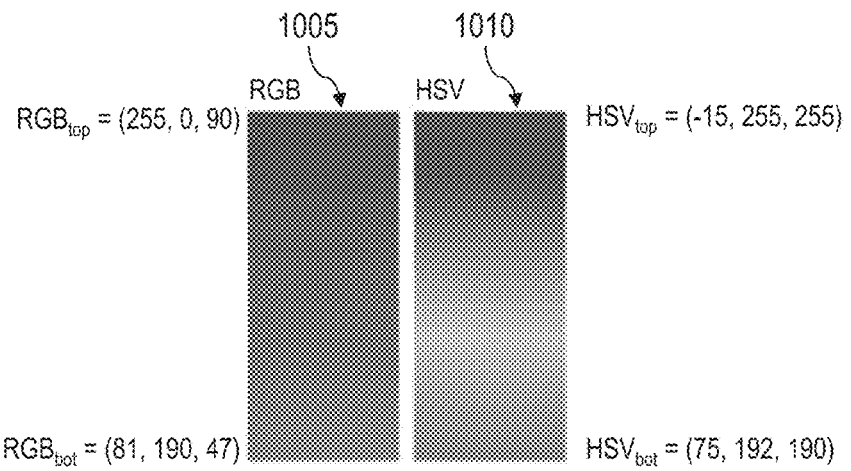
FIG. 10A illustrates example color regions having the same endpoint color values with color values between these endpoint color values interpolated in different color spaces.

FIG. 10A illustrates color regions 1005 and 1010 having the same endpoint color values with color values between these endpoint color values interpolated in the RGB color space and the HSV color space, respectively. The endpoint colors are represented using the RGB color space with 8 bits (i.e., 256 values) in each of the R-, G-, and B-dimensions or, equivalently, the HSV color space with 8 bits in each of the H-, S-, and V-dimensions. The endpoint colors for the color region 1005 are represented in the RGB color space by R, G, and B coordinates (81, 190, 47) and (255, 0, 90) and, equivalently, represented in the HSV color space by H, S, and V coordinates (75, 192, 190) and (−15, 255, 255).

Figures 10B, 10C:
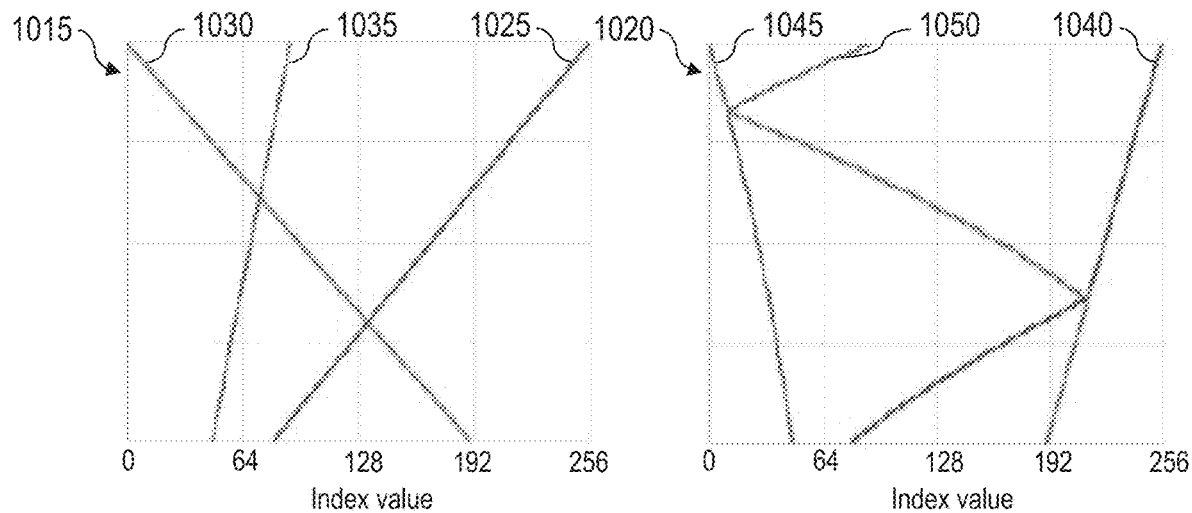
FIGS. 10B and 10C provide trajectory plots associated with the color regions shown in FIG. 10A.

FIGS. 10B and 10C provide trajectory plots 1015 and 1020, respectively, of a portion/region of a palette for generating visual representations using interpolation in the RGB color space and the HSV color space, respectively. In this regard, the trajectory plot 1015 provides the RGB color values of the color region 1005 using trajectories 1025, 1030, and 1035 for the R-, G-, and B-dimensions, respectively, of the RGB space obtained through interpolation in the RGB space. The trajectory plot 1020 provides the RGB color values of the color region 1010 using trajectories 1040, 1045, and 1050 for the R-, G-, and B-dimensions, respectively, of the RGB space obtained through interpolation in the HSV space. As shown by the trajectory plots 1015 and 1020, although a top color and a bottom color of each color bar are identical, interpolated values in between are different. As previously discussed, in some cases, the user may provide endpoint color values using RGB values to an imaging system, while the imaging system may convert the RGB values to HSV values and interpolate values between these endpoint color values in the HSV space.

FIG. 11A illustrates color regions 1105 and 1110 having the same endpoint color values with color values between these endpoint color values interpolated in the RGB color space and the HSV color space, respectively. The endpoint colors for the color region 1105 are represented in the RGB color space by R, G, and B coordinates (139, 2, 182) and (255, 0, 0) and, equivalently, represented in the HSV color space by H, S, and V coordinates (−54, 252, 182) and (0, 255, 255).

FIGS. 11B and 11C provide trajectory plots 1115 and 1120, respectively, of a portion/region of a palette for generating visual representations using interpolation in the RGB color space and the HSV color space, respectively. In an aspect, the interpolation associated with the color region 1110 and shown by the trajectory plot 1120 is performed by rotating clockwise around the hue circle. The trajectory plot 1115 provides the RGB color values of the color region 1105 using trajectories 1125, 1130, and 1135 for the R-, G-, and B-dimensions, respectively, of the RGB space obtained through interpolation in the RGB space. The trajectory plot 1120 provides the RGB color values of the color region 1110 using trajectories 1140, 1145, and 1150 for the R-, G-, and B-dimensions, respectively, of the RGB space obtained through interpolation in the HSV space.

FIG. 12A illustrates the color region 1105 and a color region 1210 having the same endpoint color values with color values between these endpoint color values interpolated in the RGB color space and the HSV space, respectively. The endpoint color values of the color regions 1105, 1110, and 1210 are the same. The endpoint colors for the color region 1105 are represented in the RGB color space by R, G, and B coordinates (139, 2, 182) and (255, 0, 0) and, equivalently, represented in the HSV color space by H, S, and V coordinates (202, 252, 182) and (0, 255, 255).

FIGS. 12B and 12C provide the trajectory plot 1115 and a trajectory plot 1220, respectively, of a portion/region of a palette for generating visual representations using interpolation in the RGB color space and the HSV color space, respectively. In an aspect, the interpolation associated with the color region 1210 and shown by the trajectory plot 1220 is performed by rotating counter-clockwise around the hue circle. Furthermore, as shown by the color regions 1110 and 1210 and the trajectory plots 1120 and 1220, although the color regions 1110 and 1210 have the same endpoint color values, different interpolations in the HSV space between these endpoint colors are performed to obtain the color regions 1110 and 1210. The trajectory plot 1115 provides the RGB color values of the color region 1105 using trajectories 1125, 1130, and 1135 for the R-, G-, and B-dimensions, respectively, of the RGB space obtained through interpolation in the RGB space. The trajectory plot 1220 provides the RGB color values of the color region 1210 using trajectories 1240, 1245, and 1250 for the R-, G-, and B-dimensions, respectively, of the RGB space obtained through interpolation in the HSV space.

Figure 13:
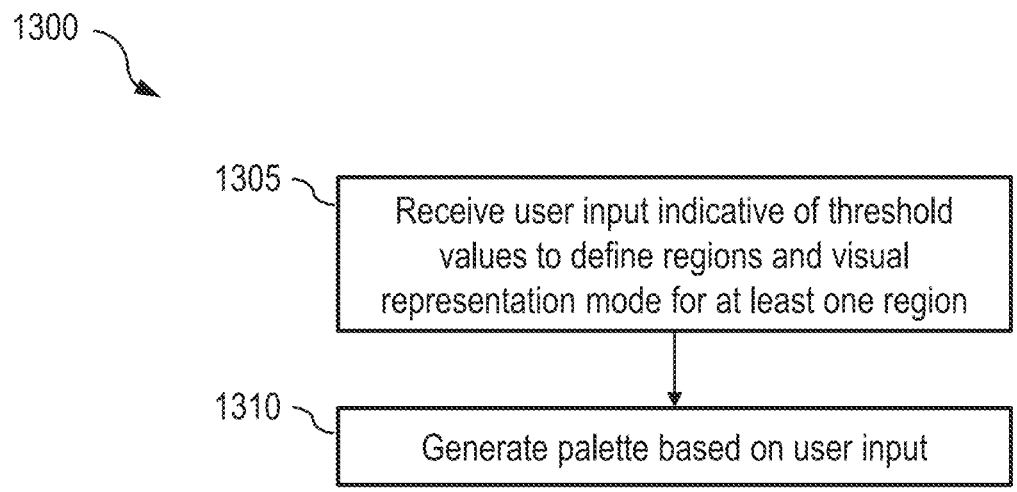
FIG. 13 illustrates a flow diagram of an example process for facilitating palette generation in accordance with one or more embodiments of the present disclosure.

FIG. 13 illustrates a flow diagram of an example process 1300 for facilitating palette generation in accordance with one or more embodiments of the present disclosure. Although the process 1300 is primarily described herein with reference to the system 400 of FIG. 4 for explanatory purposes, the process 1300 can be performed in relation to other systems for facilitating palette generation and/or infrared image generation.

At block 1305, the palette generation device 405 receives user input from a user to facilitate defining/generating a palette. The user input may include input indicative of threshold values (e.g., threshold temperature values) to divide an output range (e.g., temperature range) of the into regions. In an embodiment, the threshold values may be threshold temperature values, the output range may be a temperature range, and each region may be a temperature region. Each temperature region is bounded by at least one threshold value provided as part of the user input. It is noted that, while the threshold values, output range, and regions are associated with using temperature values, the threshold values, output range, and/or regions may be represented/quantified using temperature values, percentages of the output temperature range (e.g., with 0% and 100% corresponding to the minimum temperature and maximum temperature, respectively), pixel data values, and/or generally any values that corresponding to the temperature values.

The user input may include input indicative of a visual representation mode of at least one of the regions. For a given region, the visual representation mode may be a color mode or a grayscale mode. In this regard, a region may be adjacent to one grayscale region, two grayscale regions, one color region, two color regions, or one grayscale region and one color region. In some cases, the user input may include input to set a respective color value to one or more of the threshold values. In some cases, the user may set a region to be a grayscale region by not setting a color value for a threshold value or both threshold values (e.g., depending on whether the region is bound by one or two threshold values, whether the region is adjacent to a color region or another grayscale region, etc.).

At block 1310, the palette generation device 405 generates a palette based on the user input received at block 1305. The palette provides a mapping between temperature values and visual representation values. In some cases, the palette may also include other setting. As an example, in FIG. 5, the palette may indicate whether to represent threshold values as temperatures or percentages of a temperature range, whether to display a color bar, and so forth. In some cases, one of more of these other settings may tied to the palette and/or one or more of these other settings be a global setting(s) independent of the palette. In an embodiment, generating the palette may include interpolation by the palette generation device 405 between pairs of color values that bound a region to obtain interpolated color values. For a given pair of color values that bound a region, the interpolated color values correspond to temperature values between threshold temperature values corresponding to the pair of color values. The palette may be stored for future selection (e.g., to apply to captured infrared image data), adjustment by the user, and/or sharing by the user (e.g., with other users). In some cases, the user may adjust the palette generated at block 1310 (e.g., change one of the threshold temperature values and/or corresponding color values) and overwrite the palette with the adjusted palette or store the adjusted palette as a new palette (e.g., both the palette generated at block 1310 and the subsequently adjusted palette are stored).

As provided above, FIGS. 8A and 8B provide an example palette generated based on user input. The user input may indicate setting threshold temperature values to −40° C., 25° C., 35° C., and 550° C. The user input may indicate that features falling in the region bounded by 25° C. and 35° C. be represented using a color mode. The user input may indicate that features falling in the region below −40° C., the region bounded by −40° C. and 25° C., the region bounded by 35° C. and 550° C., and the region above 550° C. be represented using a grayscale mode. In some cases, a lack of input from the user for a given region may cause the palette generation device 405 to set the region to be represented using the grayscale mode. In these cases, the grayscale mode may be a default visual representation mode, and the user input to set threshold temperature values together with a lack of user input with regard to a visual representation mode of a certain region may be referred to as user input indicative of setting this region to be represented using the grayscale mode.

Figure 14:
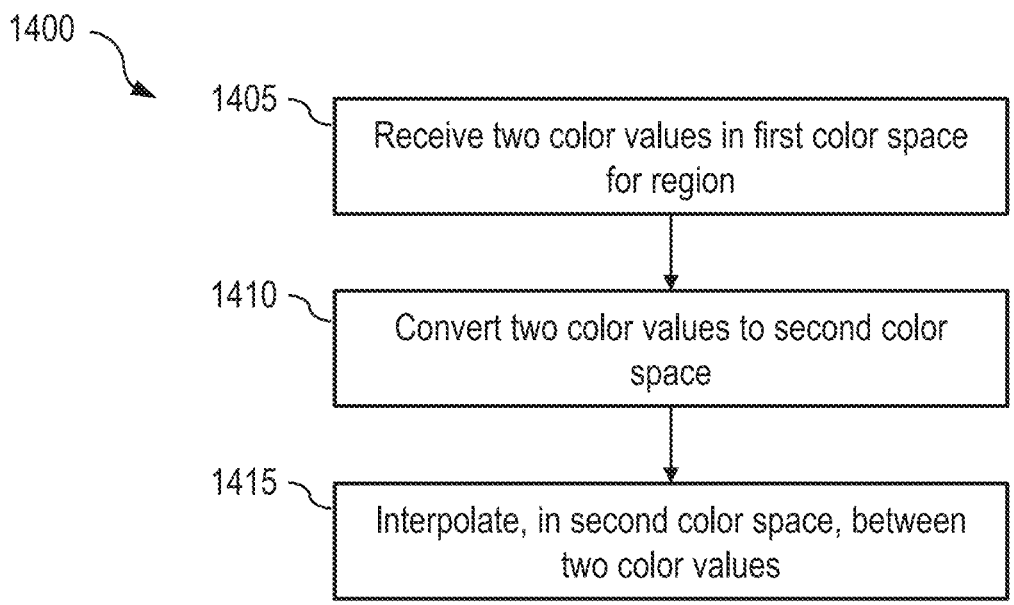
FIG. 14 illustrates a flow diagram of an example process for interpolating between color values in accordance with one or more embodiments of the present disclosure.

FIG. 14 illustrates a flow diagram of an example process 1400 for interpolating between color values in accordance with one or more embodiments of the present disclosure. Although the process 1400 is primarily described herein with reference to the system 400 of FIG. 4 for explanatory purposes, the process 1400 can be performed in relation to other systems for facilitating palette generation. In an embodiment, the process 1400 is part of block 1310 of FIG. 13. The process 1400 may define a portion of the palette. For example, the portion of the palette may provide a mapping between color values and temperature values that fall within a temperature region.

At block 1405, the palette generation device 405 receives two color values in a first color space for a region. The color values correspond to threshold values that bound/define the region. In an embodiment, the color values may be part of the user input received at block 1305 of FIG. 13. At block 1410, the palette generation device 405 converts the two color values to a second color space. In an embodiment, the first color space may be an RGB color space, CMY color space, or other color space generally considered more intuitive/accessible to most users, and the second color space may be an HSV color space. Other combinations of first and second color spaces may be used in other embodiments. At block 1415, the palette generation device 405 interpolates, in the second color space, between the two color values to obtain interpolated color values for the region. Although the process 1400 provides a process in which the user provides color values for threshold temperatures in a color space different from a color space used by the palette generation device 405 for performing interpolation, in some embodiments the user may provide the color values in the same color space as that used by the palette generation device 405 for performing interpolation.

Although the foregoing describes various interpolations and mappings associated with representing image data values using color values and/or grayscale values, each region may be represented using color values and/or grayscale values using other techniques. In one example, for a region (e.g., defined by the user), a palette may define that colorization of pixel data values that fall within that region may involve mapping the pixel data values to (e.g., colorizing the pixel data values using) color values according an automatic gain control (AGC) algorithm and a colorization lookup table. In another example, for a region, a palette may define that colorization of pixel data values that fall within that region may involve mapping the pixel data values to a specified (e.g., user specified) color value for the region and with luminance values based on the specified color value. In some cases, the luminance values are from an AGC algorithm and chrominance from a color of the lower boundary of the region. Such a case may be used to support monochrome color palettes. In another example, each region has one color specified by the user. Colors of a base lookup table may be processed to extract their luminosity, and the luminosity then multiplied by the specified color. In this manner, the luminosity of the base lookup table is preserved, but color is changed. In another example, a region has one color specified by the user. A resulting color is an average of a base lookup color and the specified color for the region. In another example, a histogram equalization (HEQ) may be performed on a full 16-bit histogram to compress to an 8-bit grayscale, then pre-defined lookup tables used to translate from 8-bit grayscale to a colorized image. In another example, for a region, a palette may define that pixel data values that fall within that region be represented using grayscale values (e.g., in which R=G=B) based on a population of all pixels in gray regions (e.g., non-linear gray regions) and ignoring those pixels in regions not represented using grayscale values. For example, if a first region is set to be a gray region and has 40% of the total population and a second region is set to be a gray region and has 10% of the total population, then the first region receives 80% of the total gray shades and the second region receives 20% of the total gray shades. In some cases, a distribution of gray shades within the region is not linear but rather allocates grayshades to populated bins.

Figure 15:
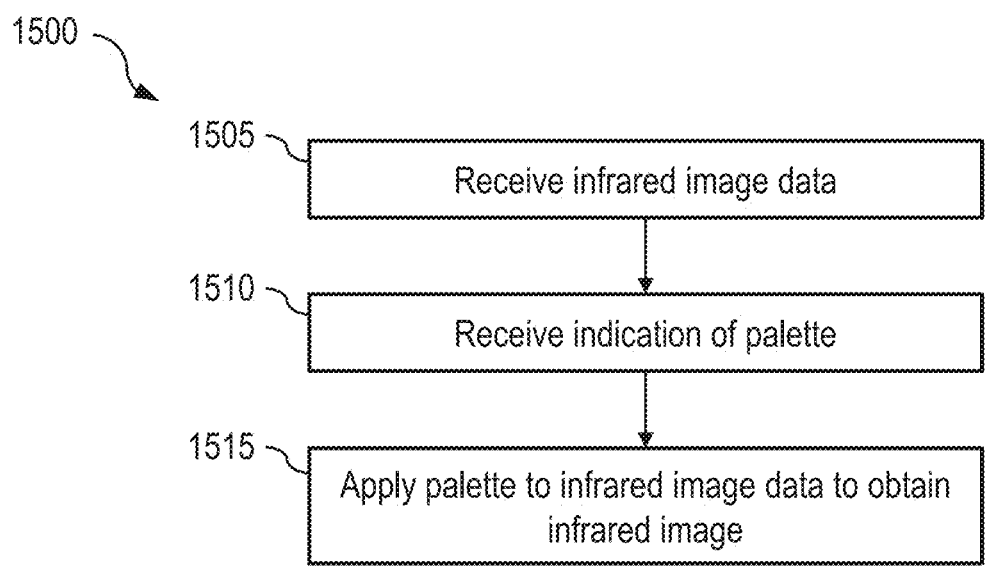
FIG. 15 illustrates a flow diagram of an example process for facilitating infrared image generation using a palette in accordance with one or more embodiments of the present disclosure.

FIG. 15 illustrates a flow diagram of an example process 1500 for facilitating infrared image generation using a palette in accordance with one or more embodiments of the present disclosure. Although the process 1500 is primarily described herein with reference to the system 400 of FIG. 4 for explanatory purposes, the process 1500 can be performed in relation to other systems for facilitating palette generation and/or infrared image generation. Note that one or more operations in FIG. 15 may be combined, omitted, and/or performed in a different order as desired.

At block 1505, the visual representation device 415 receives infrared image data from the FPA 410. The infrared image data may include, for each detector of the FPA 410, a corresponding pixel having an infrared data value representing an intensity of infrared radiation received by the detector. For example, the FPA 410 may include an ADC circuit that outputs each infrared data value as a 14-bit digital count value (e.g., 0 to 16,383) and provides these 14-bit digital count values to the visual representation device 415. In some cases, the FPA 410 may be used to capture thermal infrared radiation and generate thermal infrared data values. At block 1510, the visual representation device 415 receives an indication of a palette to be applied to the infrared image data to represent the infrared image data. In some cases, the user may select the palette from among predefined palettes. In some cases, the user may define a new palette and/or adjust a predefined palette to apply to the infrared image data. As one example, the palette to be applied to the infrared image data may be the palette generated according to the process 1300 of FIG. 13. In some cases, if the user does not specify a palette, the visual representation device 415 may select a default palette (e.g., a palette previously and/or most commonly used by the user). At block 1515, the visual representation device 415 applies the palette indicated at block 1510 to the infrared image data to obtain an infrared image. In an embodiment, the infrared image may be stored, displayed (e.g., using the display device 420), and/or further processed (e.g., prior to and/or after storage and/or display).

Although the process 1500 is described with reference to the system 400 of FIG. 4 in which a palette is applied by the system 400 to image data captured by the system 400 (e.g., the palette is applied in around real-time as the image data is captured and provided to the visual representation device 415), the process 1500 may apply a palette to image data and/or images previously captured/generated (e.g., by the system 400 and/or other system) and stored. The stored image data and/or images (e.g., stored snapshots and/or video clips) may then be accessed/retrieved for processing at a later point in time. Such processing may include, for example, applying a palette and/or a clipping value to the stored image data and/or images. For example, the stored image data and/or images may be processed using an image-viewing/image-processing software tool that is part of the system 400 or separate from the system 400. In some cases, to facilitate such future processing, metadata associated with the image data and/or images may be stored in association with the image data and/or images. For example, the metadata may include operating conditions, such as an operating temperature of the detector array, NUC correction terms associated with the detector array, etc., and/or other data (e.g., date and time image data was captured, whether image was captured in high gain mode or low gain mode, etc.) that may be used to determine a palette, a clipping value, and/or other aspects related to the image data and/or images.

In one or more embodiments, at an output of an imaging system (e.g., an output of the image detector circuit 165 and/or the readout circuit 170), some or all pixels (e.g., detectors) of a detector array may rail (e.g., saturate) at values less than a maximum digital value output by a corresponding ADC circuit(s) (e.g., 65,535 may be a maximum output value for a 16-bit ADC). Such railing may be referred to as a soft saturation, effective pixel saturation, or simply saturation. In this regard, for a given pixel of the imaging system, a value (e.g., digital count value) at which the pixel is railed/saturated may be referred to as a soft saturation value, an effective pixel saturation value, or simply a saturation value.

In some aspects, such railing may be due to non-uniformity correction terms applied to the pixels. Each pixel may be associated with its respective non-uniformity correction terms and thus its respective soft saturation value. In some aspects, for a given pixel, an NUC correction may apply a gain correction term (e.g., to normalize responsivity) and/or an offset correction term. In this regard, each pixel's soft saturation value may be based on a per-pixel gain correction and/or a per-pixel offset correction. In some cases, the gain correction term may be inversely proportional to pixel responsivity. In some cases, the offset correction term and/or the gain correction term may vary with an operating temperature of the detector array. In an aspect, considering a 16-bit count value and both gain and offset correction, a soft saturation value for a pixel may be provided by soft saturation value equal to (65,535+offset)×gain.

Clipping may be applied to the pixels to limit a pixel value output by the pixels to the soft saturation value of a pixel of the detector array having a lowest soft saturation value. In this regard, a clipping value at which to clip the pixels may be set based on the lowest soft saturation value associated with the detector array. In some cases, the clipping value is set to the lowest soft saturation value associated with the detector array. In an aspect, the pixel having the lowest soft saturation value may be referred to as the worst-case pixel in the detector array, and/or the lowest soft saturation value may be referred to as the worst-case saturation value of the detector array. In cases where the lowest soft saturation value of the detector array can vary with conditions, such as with an operating temperature of the detector array, the clipping value may be dynamically adjusted in response to changes in conditions. Although various embodiments describe clipping in relation to infrared imaging (e.g., thermal infrared imaging), clipping may be used in imaging systems for capturing image data in other wavebands.

When pixels exhibit varying soft saturation values, a resulting image may appear grainy when imaging intense sources (e.g., sources that cause the different pixels of the detector array to rail/saturate to their respective soft saturation values). By applying the clipping value to the pixels, a resulting image generated based on data values output by the pixels (e.g., clipped data values for data values above the lowest soft saturation value of the detector array) may remove non-uniformity and graininess that may be present in an image that captures a scene having an intense source that causes the pixels to rail/saturate to their respective, different soft saturation values. For example, without clipping, such non-uniformity and graininess may be apparent when imaging an intense but uniform source (e.g., a uniform, high-temperature source) due to different pixels having different soft saturation values.

Figure 16A:
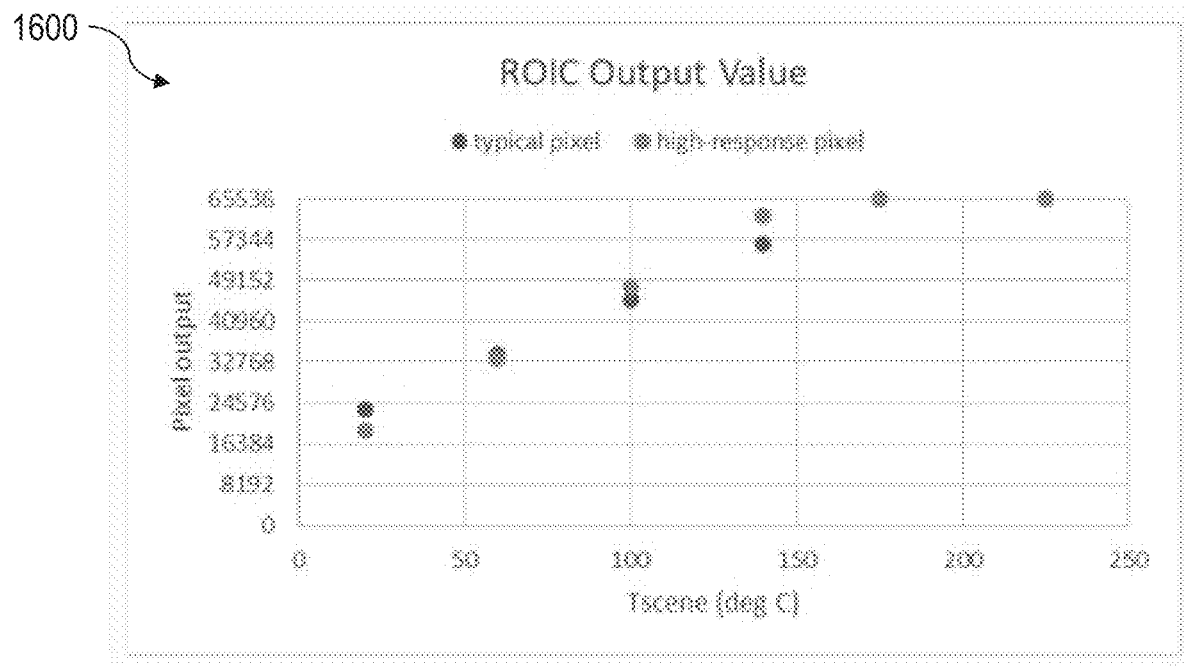
FIGS. 16A and 16B illustrate graphs showing different scene temperatures and digital count values output by two pixels at these temperatures without and with, respectively, non-uniformity correction applied to one of the pixels.
Figure 16B:
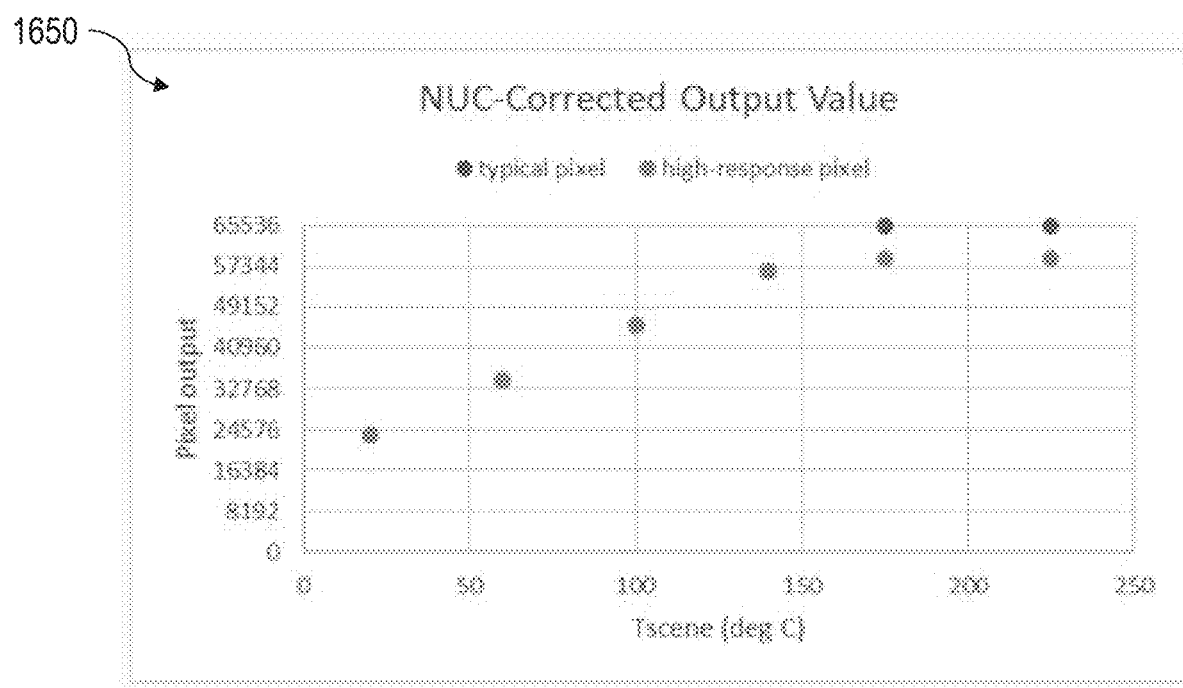

As an example of an effect of a gain correction term, FIGS. 16A and 16B illustrate graphs 1600 and 1650 showing different scene temperatures and digital count values output by two pixels at these temperatures. In particular, the graphs 1600 and 1650 show the digital count values output by a high-response pixel and a typical pixel (e.g., a pixel having a lower responsivity than the high-response pixel). In FIG. 16A, no NUC correction is applied. In FIG. 16B, a gain correction term is applied to obtain the digital count values in the graph 1650.

As shown by the graph 1600 in FIG. 16A, the high-response pixel has a steeper slope than the typical pixel due to the higher responsivity of the high-response pixel. As shown by the graph 1650 in FIG. 16B, a gain correction term less than unity is applied to normalize the responsivity of the high-response pixel. By applying this gain correction term, the high-response pixel has the same slope (e.g., corrected responsivity) as the typical pixel. Since the gain correction term is less than unity, the high-response pixel has a soft saturation value lower than 65,535 due to the applied gain correction term (e.g., gain×65,535<65,535 when gain is less than 1). The digital count values output by the high-response pixel at higher scene temperature (e.g., at around 175° C. and 225° C. in some cases) rail to this soft saturation value.

Figure 17A:
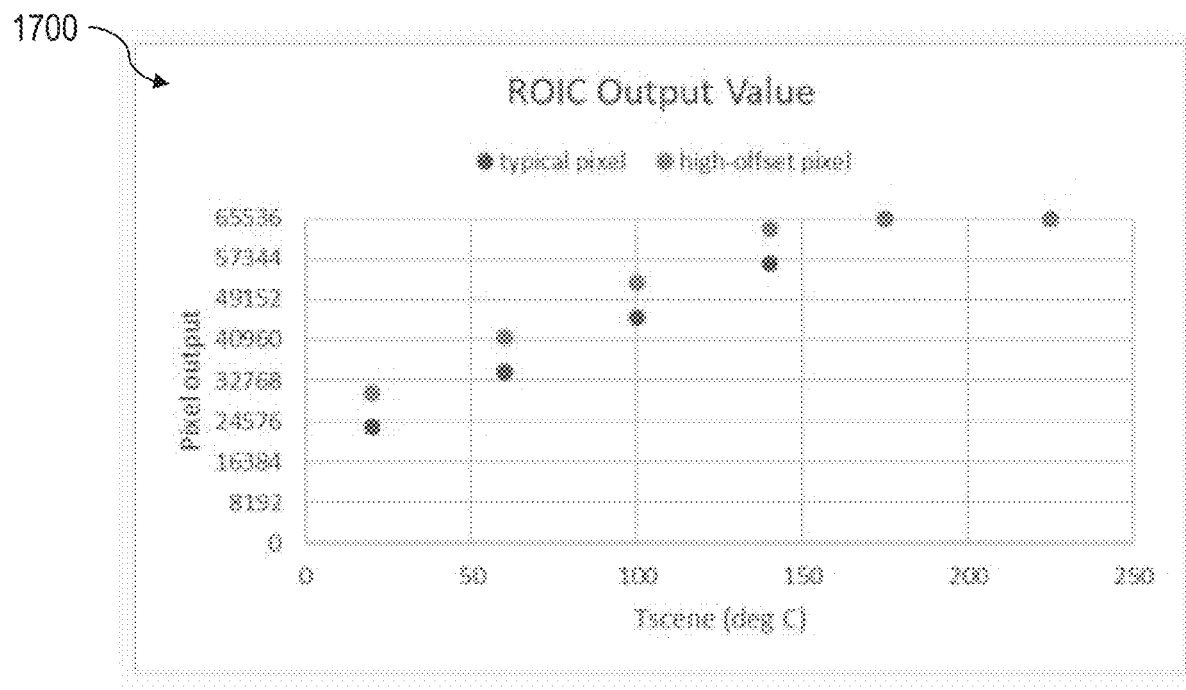
FIGS. 17A and 17B illustrate graphs showing different scene temperatures and digital count values output by two pixels at these temperatures without and with, respectively, non-uniformity correction applied to one of the pixels.
Figure 17B:
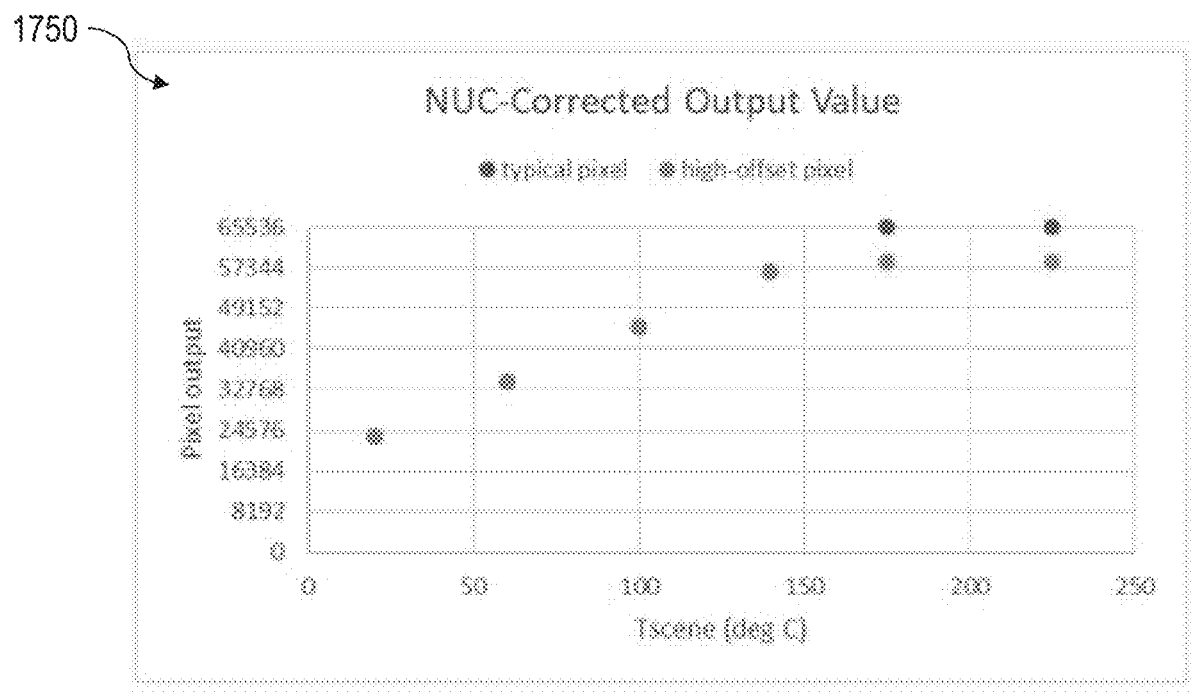

As an example of an effect of an offset correction term, FIGS. 17A and 17B illustrate graphs 1700 and 1750 showing different scene temperatures and digital count values output by two pixels at these temperatures. In particular, the graphs 1700 and 1750 show the digital count values output by a high-offset pixel and a typical pixel. In FIG. 17A, no NUC correction is applied. In FIG. 17B, an offset correction term is applied to obtain the digital count values in the graph 1750. In this regard, a negative offset value gain is applied to remove the offset of the high-offset pixel such that the corrected output of the high-offset pixel and the output of the typical pixel overlay each other. Since the offset correction term is negative, the high-offset pixel has a soft saturation value lower than 65,535 due to the applied offset correction term (e.g., 65,535+offset<65,535 when offset is negative). The digital count values output by the high-offset pixel at higher scene temperature (e.g., at around 175° C. and 225° C. in some cases) rail to this soft saturation value.

In general, for a given imaging system (e.g., a camera), NUC correction terms are calibrated and stored as part of a manufacturing process. The worst-case soft saturation value (e.g., the lowest soft saturation value) may be determined from the stored NUC tables. In some aspects, when an imaging system has pixels with gain terms and offset terms that remain constant for a given NUC table, the worst-case soft saturation value is a scalar. In some aspects, an imaging system may have pixels with offset terms that vary with operating temperature. The temperature dependence may be deterministic and thus may be determined from the stored NUC tables. The worst-case soft saturation value may be computed as a function of operating temperature (e.g., as part of the calibration process) and stored (e.g., as a lookup table). When a current operating temperature falls between two points of the lookup table, the imaging system may interpolate between the points to obtain offset terms at the current temperature. During operation, the imaging system may refer to the stored lookup table to find the worst-case soft saturation value for a current operating temperature. An output of the pixels may be clipped to this value, either at an output of a NUC correction block (e.g., of a processor) or another downstream location in a signal pipeline. In other aspects, an imaging system may have gain terms and/or offset terms that depend on operating temperature and/or other operating conditions.

Figure 18A:
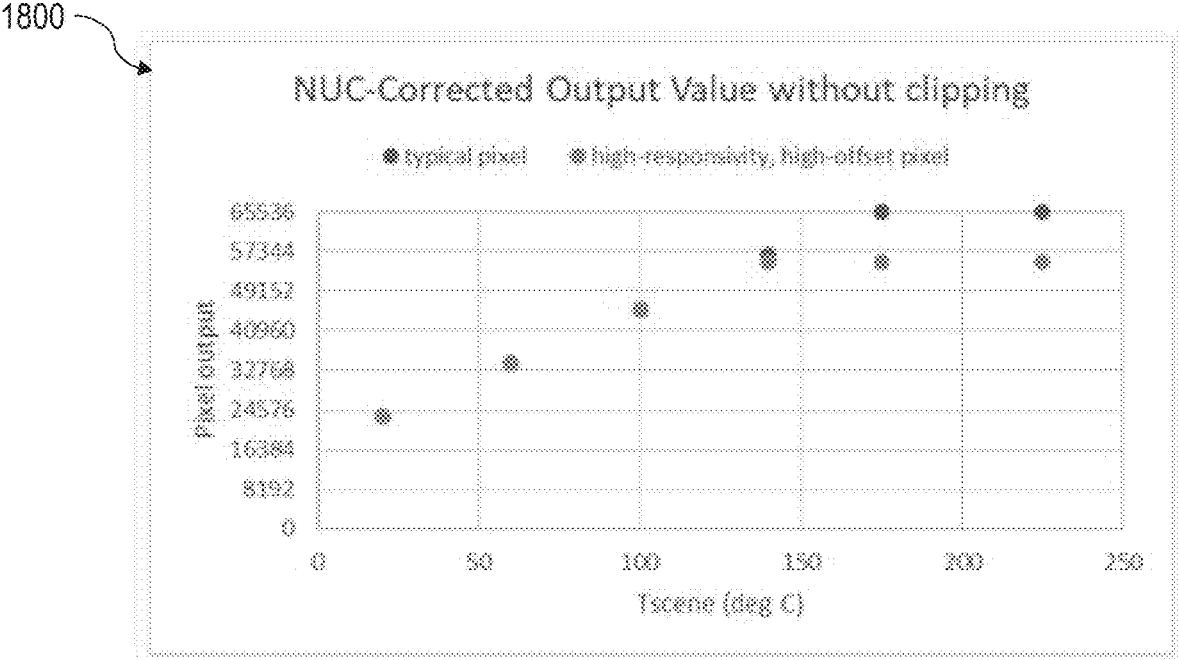
FIGS. 18A and 18B illustrate graphs of pixel output without clipping and with clipping, respectively, in accordance with one or more embodiments of the present disclosure.
Figure 18B:
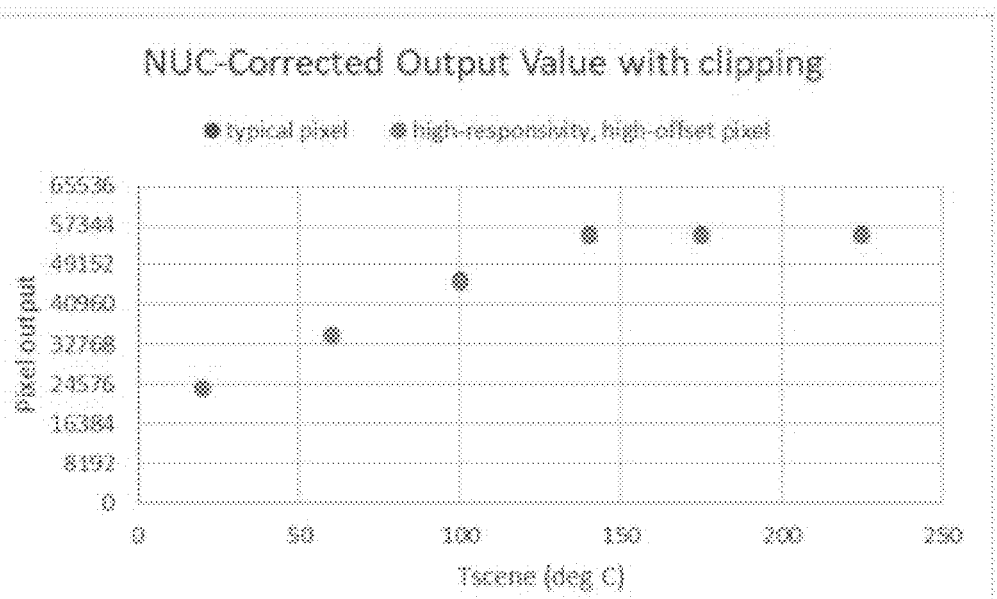

As an example, FIGS. 18A and 18B illustrate graphs 1800 and 1850 of pixel output without clipping and with clipping, respectively. In particular, the graphs 1800 and 1850 show the digital count values output by a high-response, high-offset pixel and a typical pixel (e.g., a pixel having a lower responsivity and a lower offset than the high-response, high-offset pixel). In this example, the high-response, high-offset pixel is the worst-case pixel. As shown by the graph 1800 in FIG. 18A, the high-response, high-offset pixel has a soft saturation value lower than 57,344. As shown by the graph 1850 in FIG. 18B, an output of the typical pixel is clipped to the soft saturation value of the high-response, high-offset pixel. In some cases, whether or not clipping is performed may be set by a user.

Figure 19A:
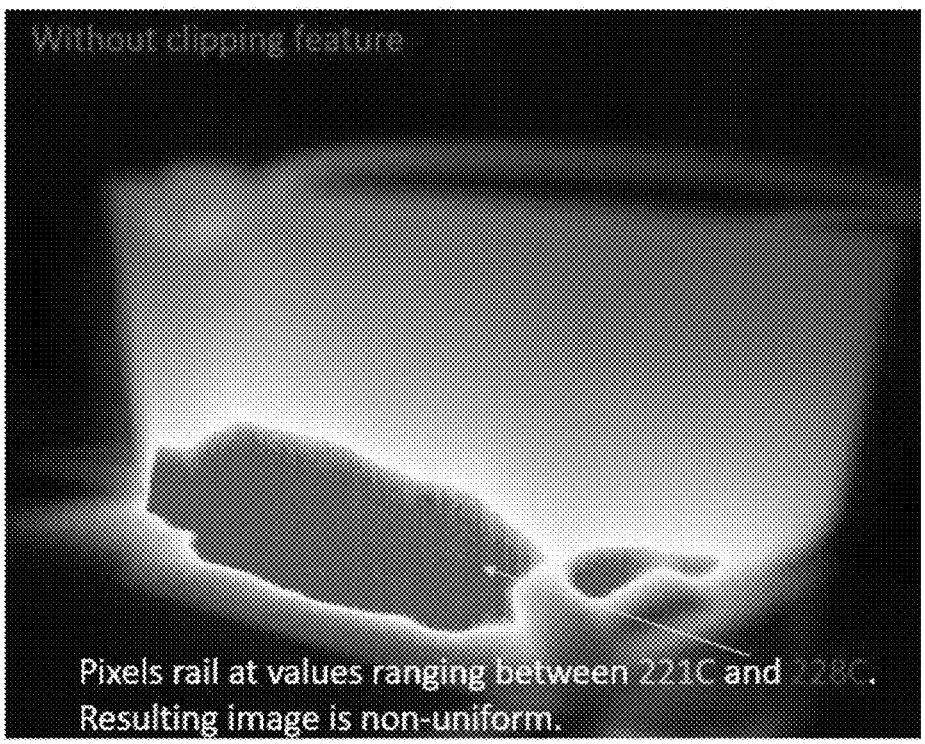
FIG. 19A illustrates an example image in which clipping is not applied to pixels in accordance with one or more embodiments.

FIG. 19A illustrates an example image in which clipping is not applied to pixels. The image is formed of 16-bit pixel values, with a range of the pixel values being between 0 and 65,535 counts, inclusive. The image shows a pot on a stove, with a hot object in a bottom portion of the pot. The hot object is approximately uniform in temperature. The image appears grainy due to pixel-to-pixel variations in the soft saturation values of the pixels. For example, the soft saturation values of the pixels may range between 62,941 and 65,535 counts. In this example, the lowest soft saturation value associated with the pixels and the image is 62,941 counts. The pixels imaging the bottom portion of the pot are railed to their respective saturation values (e.g., soft saturation values for those pixels that rail below 65,535 counts). In this regard, even though the bottom portion of the pot may be hotter than the temperature associated with a count value of 62,941, the output value of the pixel outputting the count value of 62,941 cannot increase above 62,941. For example, 62,941 counts (e.g., the lowest soft saturation value) may correspond to 221° C. and 65,535 counts may correspond to 228° C. Other pixels may rail between these output levels.

Figure 19B:
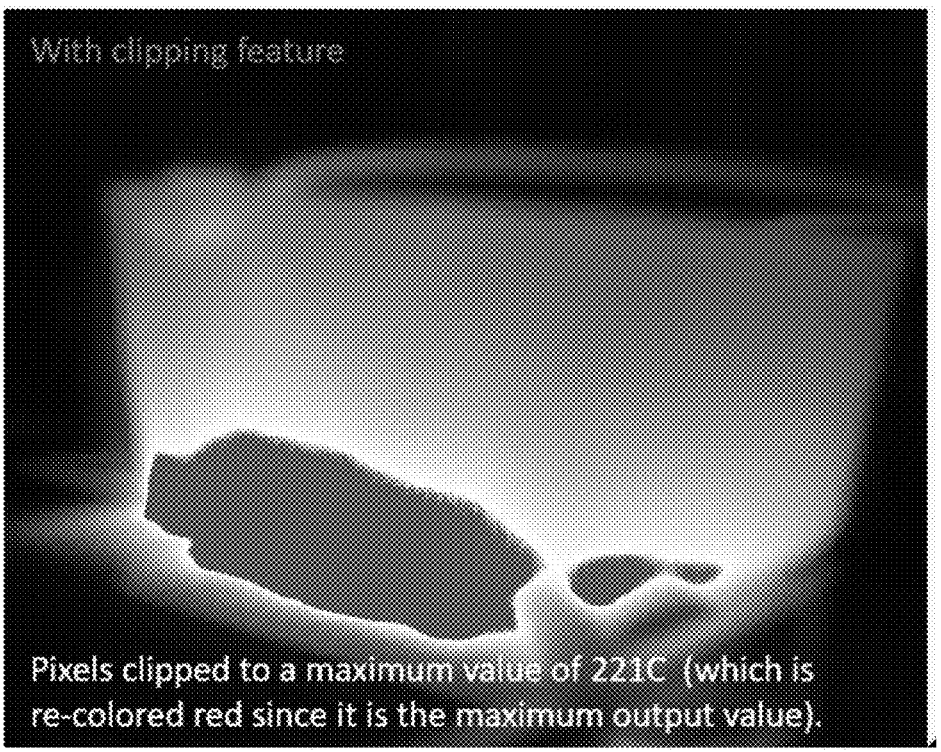
FIG. 19B illustrates the image of FIG. 19A except with clipping applied to the pixels in accordance with one or more embodiments.

FIG. 19B illustrates the image of FIG. 19A except with clipping applied to the pixels in accordance with one or more embodiments. The image may have pixels clipped to the lowest soft saturation value (e.g., 62,941 in the example above). Such clipping reduces or removes the graininess of the image of FIG. 19A associated with pixel-to-pixel variations in the soft saturation values. In some aspects, clipping the pixels reduces a scene dynamic range of all pixels to a dynamic range associated with a worst-case soft saturation value while providing a generally less grainy and more aesthetically pleasing image.

Figure 20:
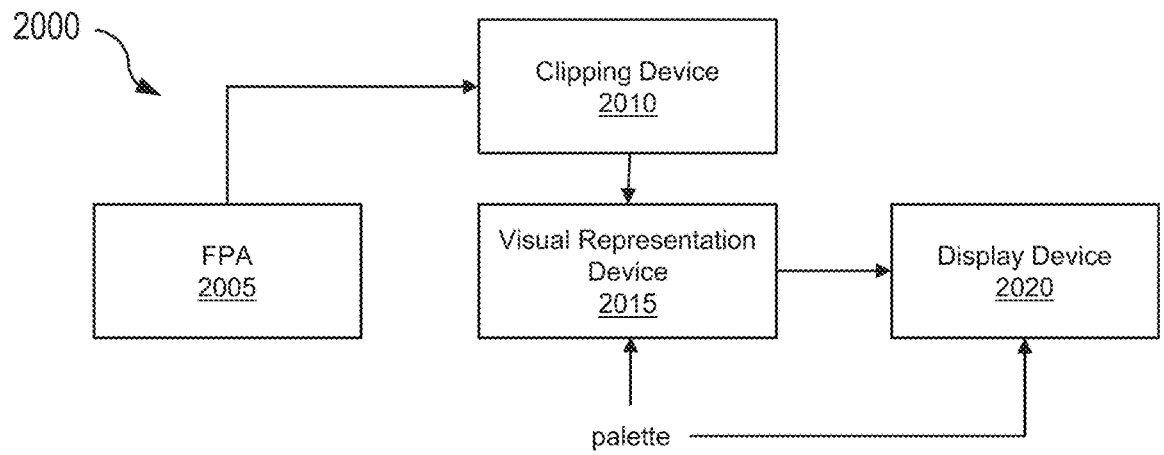
FIG. 20 illustrates an example system for facilitating infrared image generation in accordance with one or more embodiments of the present disclosure.

FIG. 20 illustrates an example system 2000 for facilitating infrared image generation in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the description of various components of the system 400 of FIG. 4 generally applies to corresponding components of the system 2000 of FIG. 20.

The system 2000 includes an FPA 2005, a clipping device 2010, a visual representation device 2015, and a display device 2020. In an embodiment, the FPA 2005, the clipping device 2010, and/or the visual representation device 2015 may be implemented using one or more processing circuits on a single chip or distributed across two or more chips.

The FPA 2005 includes a detector array and an ROIC. At least some of detectors may be associated with their respective NUC terms and thus their respective soft saturation value. The FPA 2005 receives light from a scene and generates infrared data values (e.g., thermal infrared data values) based on the light (e.g., infrared component of the light). For example, the FPA 2005 may include or may be coupled to an ADC circuit that generates infrared data values based on infrared radiation. A 16-bit ADC circuit may generate infrared data values that range from 0 to 65,535. In an aspect, the detector array is an infrared detector array (e.g., microbolometer array) that detects IR radiation (e.g., thermal IR radiation). In an embodiment, the FPA 2005 may be implemented by the image capture component 115.

The clipping device 2010 receives the infrared data values from the FPA 2005 and clips the infrared data values that are above to the lowest soft saturation value (e.g., the worst-case soft saturation value) of the detector array to the lowest soft saturation value to obtain adjusted infrared data values (e.g., also referred to as clipped infrared data values). In some cases, the clipping device 2010 may determine the lowest soft saturation value based on a current operating temperature of the FPA 2005 (e.g., the operating temperature at the time the FPA 2005 captures the light to generate the infrared data values). In an aspect, for a scene that causes none of the detectors of the FPA 2005 to rail to their soft saturation values, the clipping device 2010 does not adjust any of the infrared data values from the FPA 2005. A temperature sensor (e.g., of the imaging system 100) may be coupled to the FPA 2005 to detect/monitor a temperature of the FPA 2005.

The visual representation device 2015 receives a palette (or an indication of the palette) and the adjusted infrared data values from the clipping device 2010 and applies the palette to the adjusted infrared data values to generate an infrared image. The visual representation device 2015 may include a selection (e.g., user selection, default selection) of the palette. In an aspect, the palette may be a palette generated using the process 1300 of FIG. 12. The display device 2020 also receives the infrared image from the visual representation device 2015 and displays the infrared image (e.g., to the user and/or other viewers). More generally, images output by the visual representation device 2015 may be provided for display using the display device 2020, storage (e.g., using the memory component 110), and/or further processing (e.g., prior to display). In an embodiment, the display device 2020 may be, may include, or may be a part of, the display component 130.

Figure 21:
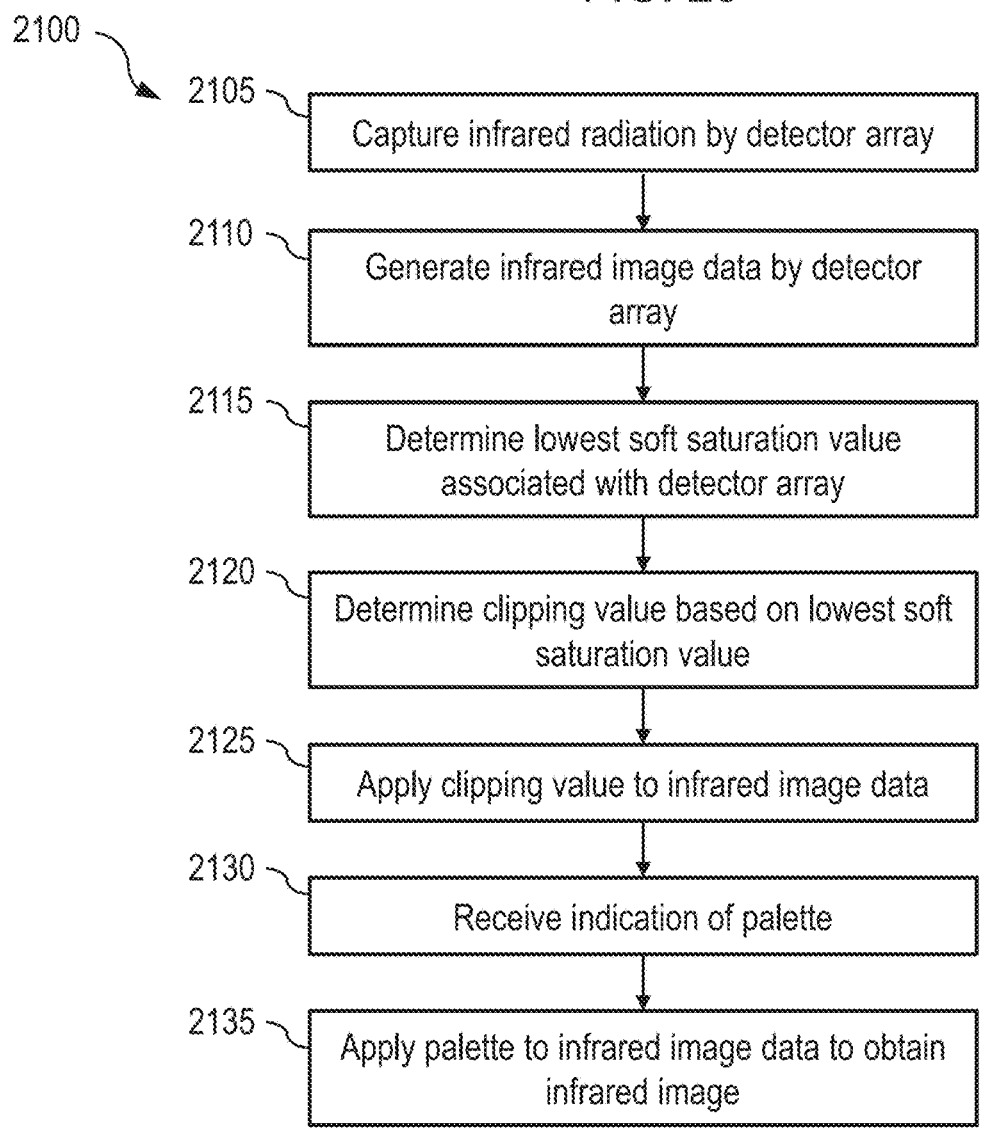
FIG. 21 illustrates a flow diagram of an example process for facilitating infrared image generation accordance with one or more embodiments of the present disclosure.

FIG. 21 illustrates a flow diagram of an example process 2100 for facilitating infrared image generation accordance with one or more embodiments of the present disclosure. Although the process 2100 is primarily described herein with reference to the system 2000 of FIG. 20 for explanatory purposes, the process 2100 can be performed in relation to other systems for facilitating infrared image generation. Note that one or more operations in FIG. 21 may be combined, omitted, and/or performed in a different order as desired.

At block 2105, the FPA 2005 captures infrared radiation. The FPA 2005 may be at a certain operating temperature (e.g., referred to as a current operating temperature) when capturing the infrared radiation. At block 2110, the FPA 2005 generates infrared image data based on the captured infrared radiation. The infrared image data may include, for each detector of the FPA 2005, a corresponding pixel having an infrared data value representing an intensity of infrared radiation received by the detector.

At block 2115, the clipping device 2010 determines a lowest soft saturation value associated with the FPA 2005. In some cases, the clipping device 2010 may determine the lowest soft saturation value based on the operating temperature of the FPA 2005. In some cases, the clipping device 2010 may access a lookup table that identifies the lowest soft saturation value associated with the FPA 2005 at different temperatures and obtain the lowest soft saturation value for the current operating temperature of the FPA 2005. When the current operating temperature is not among the entries in the lookup table, the clipping device 2010 may interpolate using the entries in the lookup table to determine (e.g., estimate, interpolate) the lowest soft saturation value for the current operating temperature. At block 2120, the clipping device 2010 determines a clipping value based on the lowest soft saturation value associated with the FPA 2005. In an aspect, the clipping device 2010 may set the clipping value to the lowest soft saturation value. In an aspect, the clipping device 2010 may set the clipping value to a value around (e.g., approximately equal to) the lowest soft saturation value. In some cases, as an example, the clipping device 2010 may set the clipping value to a value lower than the lowest soft saturation value. Setting the value lower than the lowest soft saturation value may reduce a scene dynamic range but help accommodate other pixel corrections (e.g., other non-deterministic pixel corrections), such as those associated with scene-based NUC, column or row filters, and so forth, that may cause a pixel to rail at a value lower than its soft saturation value. As non-limiting examples, the clipping value may be set to a value around 1% less than the lowest soft saturation value, around 5% less than the lowest soft saturation value, or a percentage between 1% and 5% lower than the lowest soft saturation value.

At block 2125, the clipping device 2010 applies the clipping value to the infrared image data. In an aspect, the clipping devices 2010 applies the clipping value to the infrared image data such that each infrared data value of the infrared image data that is above the lowest soft saturation value is clipped/set to the clipping value. In some cases, when none of the infrared data values is above the lowest soft saturation value, the clipping device 2010 passes the infrared image data received from the FPA 2005 without adjusting any infrared data values of the infrared image data.

At block 2130, the visual representation device 2015 receives an indication of a palette to be applied to the infrared image data to represent the infrared image data. In some cases, the user may select the palette from among predefined palettes. In some cases, the user may define a new palette and/or adjust a predefined palette to apply to the infrared image data. As one example, the palette to be applied to the infrared image data may be the palette generated according to the process 1300 of FIG. 13. In some cases, if the user does not specify a palette, the visual representation device 2015 may select a default palette (e.g., a palette previously and/or most commonly used by the user). At block 2135, the visual representation device 2015 applies the palette indicated at block 2130 to the infrared image data from the clipping device 2010 to obtain an infrared image. In an embodiment, the infrared image may be stored, displayed (e.g., using the display device 2020), and/or further processed (e.g., prior to and/or after storage and/or display).

Although in FIGS. 20 and 21 the clipping device 2010 is configured to clip output values from the FPA 2005, in other embodiments, the clipping device 2010 may be configured to clip output values of the visual representation device 2015. In this regard, the clipping device 2010 may map visual representation values of the visual representation device 2015 that correspond to image data values above the worst-case saturation value down to the visual representation value that corresponds to the worst-case saturation value. Other manners by which to arrange the clipping device 2010 to clip output levels to mitigate effects on image quality due to pixel-to-pixel variations in the soft saturation values of the pixels may be used.

Although the process 2100 is described with reference to the system 2000 of FIG. 20 in which a clipping value is applied by the system 2000 to image data captured by the system 2000 (e.g., the clipping value is applied in around real-time as the image data is captured and provided to the clipping device 2010), the process 2100 may apply a clipping value to image data and/or images previously captured/generated (e.g., by the system 2000 and/or other system) and stored. The stored image data and/or images may then be accessed/retrieved for processing at a later point in time. Such processing may include, for example, applying a palette and/or a clipping value to the stored image data and/or images. For example, the stored image data and/or images (e.g., stored snapshots and/or video clips) may be processed using an image-viewing/image-processing software tool that is part of the system 2000 or separate from the system 2000. In some cases, to facilitate such future processing, metadata associated with the image data and/or images may be stored in association with the image data and/or images. For example, the metadata may include operating conditions, such as an operating temperature of the detector array, NUC correction terms associated with the detector array, etc., and/or other data (e.g., date and time image data was captured, whether image was captured in high gain mode or low gain mode, etc.) that may be used to determine a clipping value and/or other aspects related to the image data and/or images.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method comprising:
receiving user input indicative of a plurality of threshold temperatures to divide a temperature range into a plurality of temperature regions and a respective visual representation mode for each of the plurality of temperature regions, wherein each of the plurality of temperature regions is bound by at least one of the plurality of threshold temperatures, wherein the respective visual representation mode for each of the plurality of temperature regions is independently set to a color mode or a grayscale mode, wherein the user input comprises a first color value and a second color value for a first temperature region of the plurality of temperature regions, and wherein the first temperature region is bound by an adjacent pair of the plurality of threshold temperatures; and generating a palette based on the user input, wherein color values of the palette associated with temperatures between the adjacent pair that bound the first temperature region are based on the first color value and the second color value.

2. The method of claim 1, further comprising:

applying the palette to infrared image data to obtain an infrared image; and receiving, from a detector array or a memory, the infrared image data.

3. The method of claim 2, further comprising:

displaying the infrared image;

receiving second user input to change from the first color value to a third color value different from the first color value and the second color value;

adjusting the palette based on the second user input to obtain an adjusted palette, wherein color values of the adjusted palette associated with the temperatures between the adjacent pair that bound the first temperature region are based on the third color value and the second color value; and applying the adjusted palette to the infrared image data to obtain a second infrared image.

4. The method of claim 2, further comprising:

determining a clipping value for the detector array used to capture the infrared image data based on a soft saturation value associated with a detector of the detector array;

applying the clipping value to the infrared image data to obtain clipped infrared image data; and applying the palette to the clipped infrared image data.

5. The method of claim 4, wherein the clipping value is further based on an operating temperature associated with the detector array, and wherein the applying the clipping value comprises setting image data values of the infrared image data that are above the soft saturation value to the clipping value.

6. The method of claim 1, wherein:

the generating comprises interpolating between the first color value and the second color value to obtain the color values of the palette associated with the temperatures between the adjacent pair that bound the first temperature region, and wherein:

the user input comprises the first color value in a first color space and the second color value in the first color space;

the method further comprises converting the first color value and the second color value to a second color space different from the first color space; and the interpolating is performed in the second color space.

7. The method of claim 6, wherein the first color space is a red, green, blue (RGB) color space, and wherein the second color space is a hue, saturation, value (HSV) color space.

8. The method of claim 1, wherein:

the user input further comprises a third color value for the first temperature region of the plurality of temperature regions;

the generating comprises:

interpolating between the first color value and the third color value to obtain a first set of color values associated with a first range of temperatures of the first temperature region; and interpolating between the second color value and the third color value to obtain a second set of color values associated with a second range of temperatures of the first temperature region.

9. The method of claim 1, wherein:

the respective visual representation mode for each temperature region of a first set of the plurality of temperature regions is the color mode;

the user input comprises at least one respective color value for each temperature region of the first set; and the generating comprises generating, for each temperature region of the first set, color values associated with temperatures between a pair of the plurality of threshold temperatures that bound the temperature region based on the at least one respective color value for the temperature region.

10. The method of claim 9, wherein the respective visual representation mode for each temperature region of a second set of the plurality of temperature regions is the grayscale mode, wherein the second set comprises a second temperature region and a third temperature region, and wherein grayscale values associated with the second temperature region are different from grayscale values associated with the third temperature region.

11. The method of claim 1, wherein the plurality of temperature regions comprises the first temperature region and a second temperature region adjacent to the first temperature region, wherein the visual representation mode of the first temperature region is the color mode, and wherein the visual representation mode of the second temperature region is the grayscale mode.

12. The method of claim 1, wherein the plurality of temperature regions comprises the first temperature region and a second temperature region adjacent to the first temperature region, wherein the visual representation mode of each of the first temperature region and the second temperature region is the color mode.

13. An infrared imaging system comprising:

a processing circuit configured to:

receive user input indicative of a plurality of threshold temperatures to divide a temperature range into a plurality of temperature regions and a respective visual representation mode for each of the plurality of temperature regions, wherein each of the plurality of temperature regions is bound by at least one of the plurality of threshold temperatures, wherein the respective visual representation mode for each of the plurality of temperature regions is independently set to a color mode or a grayscale mode, wherein the user input comprises a first color value and a second color value for a first temperature region of the plurality of temperature regions, and wherein the first temperature region is bound by an adjacent pair of the plurality of threshold temperatures; and generate a palette based on the user input, wherein color values of the palette associated with temperatures between the adjacent pair that bound the first temperature region are based on the first color value and the second color value.

14. The infrared imaging system of claim 13, further comprising:

a focal plane array (FPA) comprising a detector array configured to capture infrared radiation and generate infrared image data based on the infrared radiation, wherein the infrared image data comprises, for each detector of the detector array, a corresponding data value of the infrared image data representing an intensity of infrared radiation captured by the detector;

a display device to display an infrared image, wherein each detector of the detector array is a microbolometer; and wherein the processing circuit is further configured to:
receive the infrared image data from the FPA; and
generate the infrared image based on the palette and the infrared image data.

15. The infrared imaging system of claim 14, wherein:
the processing circuit is further configured to:
determine a clipping value associated with the FPA based on a soft saturation value associated with one of the detectors of the detector array; and
apply the clipping value to the infrared image data to obtain clipped infrared image data by setting image data values of the infrared image data that are above the soft saturation value to the clipping value; and
the processing circuit is configured to generate the infrared image based on the palette and the clipped infrared image data, wherein the soft saturation value is based at least on one or more non-uniformity correction terms associated with the one of the detectors of the detector array.

16. The infrared imaging system of claim 13, wherein the processing circuit is further configured to:
obtain infrared image data stored on a memory; and
generate an infrared image based on the infrared image data, and wherein:
the processing circuit is configured to generate the palette at least by interpolating between the first color value and the second color value to obtain the color values of the palette associated with the temperatures between the adjacent pair that bound the first temperature region.

17. The infrared imaging system of claim 16, wherein:
the user input comprises the first color value in a first color space and the second color value in the first color space;
the processing circuit is further configured to convert the first color value and the second color value to a second color space different from the first color space; and
the interpolating is performed in the second color space.

18. The infrared imaging system of claim 17, wherein the second color space is a hue, saturation, value (HSV) color space.

19. The infrared imaging system of claim 13, wherein:
the user input further comprises a third color value for the first temperature region; and
the processing circuit is configured to generate the palette at least by:
interpolating between the first color value and the third color value to obtain a first set of color values associated with a first range of temperatures of the first temperature region; and
interpolating between the second color value and the third color value to obtain a second set of color values associated with a second range of temperatures of the first temperature region.

20. The infrared imaging system of claim 13, wherein the plurality of temperature regions comprises the first temperature region and a second temperature region adjacent to the first temperature region, wherein the visual representation mode of the first temperature region is the color mode, and wherein the visual representation mode of the second temperature region is the color mode.

* * * * *